US012767252B2

(12) United States Patent
Zhou et al.

(10) Patent No.: US 12,767,252 B2
(45) Date of Patent: Oct. 20, 2026

(54) METHOD AND APPARATUS FOR CONTROLLING WHEEL-LEGGED ROBOT, DEVICE, AND STORAGE MEDIUM

(71) Applicant: TENCENT TECHNOLOGY (SHENZHEN) COMPANY LIMITED, Shenzhen (CN)

(72) Inventors: Qinqin Zhou, Shenzhen (CN); Jingchen Li, Shenzhen (CN); Haitao Wang, Shenzhen (CN); Shuai Wang, Shenzhen (CN); Yu Zheng, Shenzhen (CN); Xiong Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 19/211,477

(22) Filed: May 19, 2025

(65) Prior Publication Data

US 2025/0276747 A1 Sep. 4, 2025

Related U.S. Application Data

(63) Continuation of application No. PCT/CN2023/131735, filed on Nov. 15, 2023.

(30) Foreign Application Priority Data

Apr. 25, 2023 (CN) ......................... 202310468838.2

(51) Int. Cl.
*B62D 57/02* (2006.01)

(52) U.S. Cl.
CPC .................................. *B62D 57/022* (2013.01)

(58) Field of Classification Search
CPC .................................................... B62D 57/022
See application file for complete search history.

(56) References Cited

U.S. PATENT DOCUMENTS 9,757,978 B1 * 9/2017 Emigh ...................... B60B 9/28
10,421,510 B2 * 9/2019 Aramayo, II ........ B62D 57/028
(Continued)

FOREIGN PATENT DOCUMENTS

CN 111290272 A 6/2020
CN 202220579247.3 U 6/2022
(Continued)

OTHER PUBLICATIONS

International Search Report of PCT/CN2023/131735 dated Jan. 13, 2024.

(Continued)

*Primary Examiner* — Gertrude Arthur Jeanglaude
(74) *Attorney, Agent, or Firm* — Sughrue Mion, PLLC

(57) ABSTRACT

A method for controlling a wheel-legged robot includes controlling, under a first constraint of a support region corresponding to an initial posture, through a first outer mechanical leg and at least one inner mechanical leg, the wheel-legged robot to stand on a first support surface, wherein the support region is enclosed by contact points between foot wheels of mechanical legs of the wheel-legged robot and the first support surface; and controlling a first contact point between a first foot wheel on the first outer mechanical leg and the first support surface to move in a first direction, and controlling a second contact point between a second foot wheel on the at least one inner mechanical leg and the first support surface to move in a second direction, to cause the wheel-legged robot to be switched from the initial posture to a predicted posture.

20 Claims, 11 Drawing Sheets

(56) References Cited

U.S. PATENT DOCUMENTS

| | | | | |
|---|---|---|---|---|
| 12,263,899 | B2 * | 4/2025 | Balasubramanian | B62D 57/028 |
| 2014/0288705 | A1 * | 9/2014 | Yun | B62D 57/032 700/246 |
| 2019/0031259 | A1 | 1/2019 | Aramayo, II et al. | |
| 2022/0395974 | A1 | 12/2022 | Balasubramanian | |

FOREIGN PATENT DOCUMENTS

| | | | |
|---|---|---|---|
| CN | 115583298 | A | 1/2023 |
| WO | 2021/047680 | A1 | 3/2021 |

OTHER PUBLICATIONS

Written Opinion of PCT/CN2023/131735 dated Jan. 13, 2024.
Extended European Search Report issued Apr. 28, 2026 in EP Application No. 23935018.4.

* cited by examiner

METHOD AND APPARATUS FOR CONTROLLING WHEEL-LEGGED ROBOT, DEVICE, AND STORAGE MEDIUM

CROSS-REFERENCE TO RELATED APPLICATIONS

This application is a continuation application of International Application No. PCT/CN2023/131735 filed on Nov. 15, 2023, which claims priority to Chinese Patent Application No. 202310468838.2 filed with the China National Intellectual Property Administration on Apr. 25, 2023, the disclosures of each being incorporated by reference herein in their entireties.

FIELD

The disclosure relates to the field of artificial intelligence technologies, and to a method and an apparatus for controlling a wheel-legged robot, a device, and a storage medium.

BACKGROUND

With the development of a robot control technology, some organizations and scientific research institutions have successively launched a wheel-legged robot with wheels as feet. The wheel-legged robot can quickly glide relying on foot wheels.

A hexapod wheel-legged robot is used as an example. Six foot wheels are controlled to move in different directions, to change a support region of the hexapod wheel-legged robot to perform different tasks. The hexapod wheel-legged robot is limited by a redundant structure, and location planning may be performed on each foot wheel in a direction corresponding to each foot wheel, to adjust the support region, resulting in large difficulty in adjusting the support region.

SUMMARY

According to an aspect of the disclosure, a method for controlling a wheel-legged robot, performed by a computer device, wherein the wheel-legged robot includes a body, and a plurality of mechanical legs, including two outer mechanical legs, and at least one inner mechanical leg, that are connected to the body through a plurality of hip joints, wherein a first hip joint corresponds to the at least one inner mechanical leg and is located between two hip joints for the two outer mechanical legs, wherein a first rotation center of the first hip joint corresponds to the at least one inner mechanical leg, a second rotation center of a second hip joint corresponds to a first outer mechanical leg, and wherein the first rotation center and the second rotation center are located on a same vertical plane, includes controlling, under a first constraint of a support region corresponding to an initial posture, through the first outer mechanical leg and the at least one inner mechanical leg, the wheel-legged robot to stand on a first support surface, wherein the support region is enclosed by contact points between a plurality of foot wheels of the plurality of mechanical legs of the wheel-legged robot and the first support surface; and controlling a first contact point between a first foot wheel on the first outer mechanical leg and the first support surface to move in a first direction, and controlling a second contact point between a second foot wheel on the at least one inner mechanical leg and the first support surface to move in a second direction, to cause the wheel-legged robot to be switched from the initial posture to a predicted posture.

According to an aspect of the disclosure, an apparatus for controlling a wheel-legged robot including a body, and a plurality of mechanical legs, including two outer mechanical legs, and at least one inner mechanical leg, that are connected to the body through a plurality of hip joints, wherein a first hip joint corresponds to the at least one inner mechanical leg and is located between two hip joints for the two outer mechanical legs, wherein a first rotation center of the first hip joint corresponds to the at least one inner mechanical leg, a second rotation center of a second hip joint corresponds to a first outer mechanical leg, and wherein the first rotation center and the second rotation center are located on a same vertical plane; includes at least one memory configured to store computer program code; and at least one processor configured to read the program code and operate as instructed by the program code, the program code includes mechanical leg control code configured to cause at least one of the at least one processor to control, under a first constraint of a support region corresponding to an initial posture, through the first outer mechanical leg and the at least one inner mechanical leg, the wheel-legged robot to stand on a first support surface, wherein the support region is enclosed by contact points between a plurality of foot wheels of the plurality of mechanical legs of the wheel-legged robot and the first support surface; and contact point moving code configured to cause at least one of the at least one processor to control a first contact point between a first foot wheel on the first outer mechanical leg and the first support surface to move in a first direction, and control a second contact point between a second foot wheel on the at least one inner mechanical leg and the first support surface to move in a second direction, to cause the wheel-legged robot to be switched from the initial posture to a predicted posture.

According to an aspect of the disclosure, a non-transitory computer-readable storage medium, storing computer code which, when executed by at least one processor of a wheel-legged robot including a body, and a plurality of mechanical legs, including two outer mechanical legs, and at least one inner mechanical leg, that are connected to the body through a plurality of hip joints, wherein a first hip joint corresponds to the at least one inner mechanical leg and is located between two hip joints for the two outer mechanical legs, wherein a first rotation center of the first hip joint corresponds to the at least one inner mechanical leg, a second rotation center of a second hip joint corresponds to a first outer mechanical leg, and wherein the first rotation center and the second rotation center are located on a same vertical plane, causes the at least one processor to at least control, under a first constraint of a support region corresponding to an initial posture, through the first outer mechanical leg and the at least one inner mechanical leg, the wheel-legged robot to stand on a first support surface, wherein the support region is enclosed by contact points between a plurality of foot wheels of the plurality of mechanical legs of the wheel-legged robot and the first support surface; and control a first contact point between a first foot wheel on the first outer mechanical leg and the first support surface to move in a first direction, and controlling a second contact point between a second foot wheel on the at least one inner mechanical leg and the first support surface to move in a second direction, to cause the wheel-legged robot to be switched from the initial posture to a predicted posture.

BRIEF DESCRIPTION OF THE DRAWINGS

To describe the technical solutions of some embodiments of this disclosure more clearly, the following briefly introduces the accompanying drawings for describing some embodiments. The accompanying drawings in the following description show only some embodiments of the disclosure, and a person of ordinary skill in the art may still derive other drawings from these accompanying drawings without creative efforts. In addition, one of ordinary skill would understand that aspects of some embodiments may be combined together or implemented alone.

DESCRIPTION OF EMBODIMENTS

Figure 1:
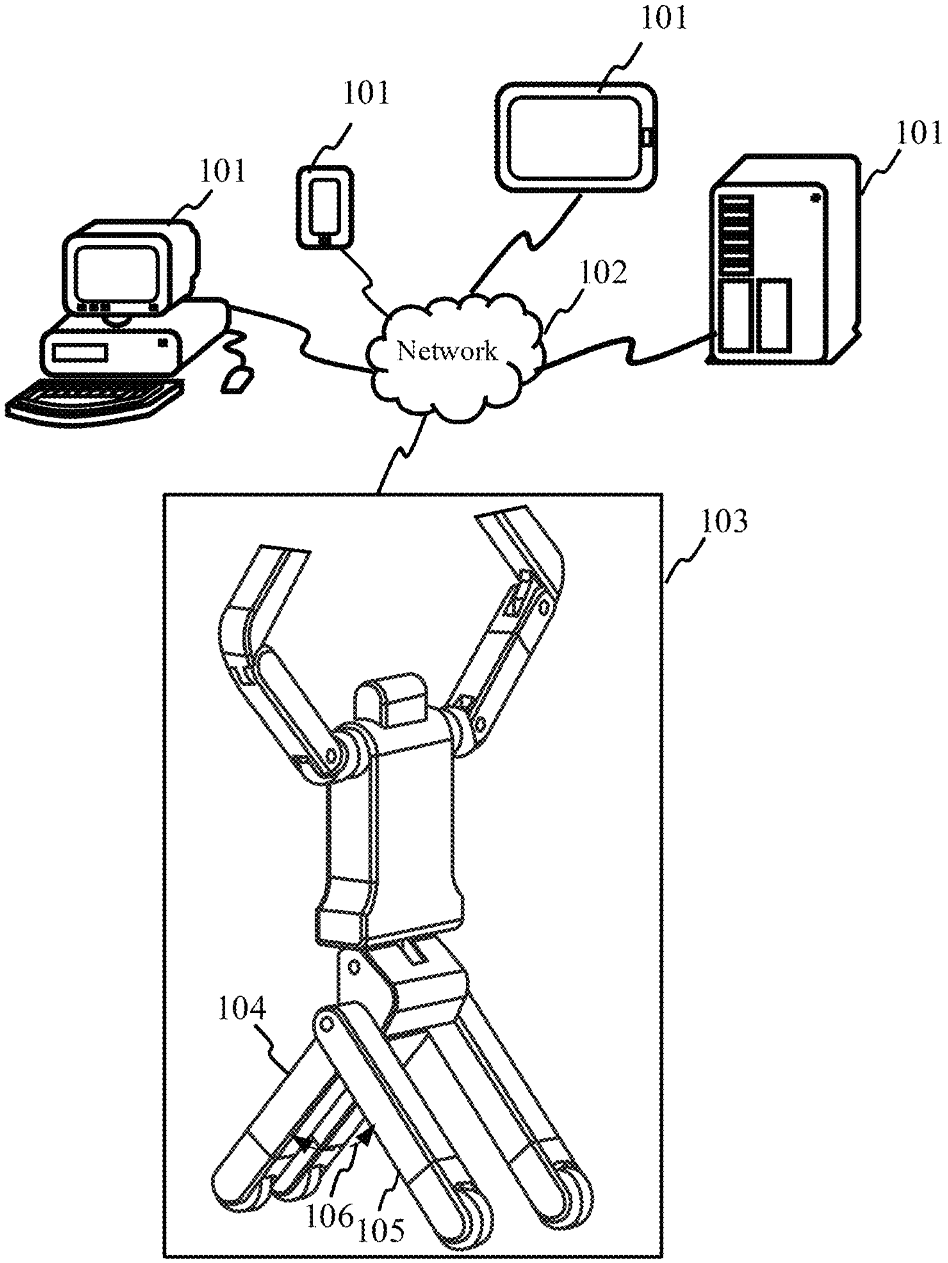
FIG. 1 is a schematic diagram of a solution implementation environment according to some embodiments.

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure.

In the following descriptions, related "some embodiments" describe a subset of all possible embodiments. However, it may be understood that the "some embodiments" may be the same subset or different subsets of all the possible embodiments, and may be combined with each other without conflict. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. For example, the phrase "at least one of A, B, and C" includes within its scope "only A", "only B", "only C", "A and B", "B and C", "A and C" and "all of A, B, and C."

Artificial intelligence (AI) is a theory, method, technology, and application system that uses a digital computer or a machine controlled by the digital computer to simulate, extend, and expand human intelligence, perceive an environment, obtain knowledge, and use knowledge to obtain an optimal result. In other words, the artificial intelligence is a comprehensive technology in computer science. The artificial intelligence attempts to understand an essence of intelligence, and produces a new intelligent machine that can react in a manner similar to the human intelligence. The artificial intelligence is to study design principles and implementation methods of various intelligent machines, to enable the machines to have functions of perception, reasoning, and decision-making.

The artificial intelligence technology is a comprehensive discipline, and relates to a wide range of fields including both a hardware-level technology and a software-level technology. Artificial intelligence technologies include technologies such as a sensor, a dedicated artificial intelligence chip, cloud computing, distributed storage, a big data processing technology, a pre-training model technology, an operating/interaction system, and electromechanical integration. The pre-training model may also be referred to as a big model or a basic model, and may be widely used in downstream tasks in various directions of artificial intelligence after fine-tuning. Artificial intelligence software technologies mainly include several major directions such as a computer vision technology, a speech processing technology, a natural language processing technology, and machine learning/deep learning.

Some embodiments relate to a robot technology in the artificial intelligence technologies, and mainly relate to robot intelligent control. A robot is a mechanical electronic device that is combined by using mechanical transmission and modern microelectronics technologies and that can imitate a skill of a human. The robot is developed based on electronic, mechanical, and information technologies. The robot does not necessarily have to look like a human, and is a member of a robot family as long as the robot can autonomously complete a task and a command assigned by a human to the robot. The robot is an autonomous machine. The machine has some intelligent capabilities, such as a sensing capability, a planning capability, an acting capability, and a coordinating capability, that are similar to those of a human or a living thing, and is an automatic machine with high flexibility. With the development of a computer technology and the artificial intelligence technologies, the robot may be improved in a functional level and a technical level. A mobile robot and technologies such as robot vision and touch may be representative.

In some embodiments, operations may be performed by a computer device. The computer device is an electronic device with data calculation, processing, and storage capabilities.

In some embodiments, the computer device may be a device such as a desktop computer or a notebook computer that is configured to control a personal computer (PC) of a wheel-legged robot; or may be a server configured to control a wheel-legged robot. The server may be an independent physical server, or may be a server cluster including a plurality of physical servers or a distributed system, or may further be a cloud server that provides cloud computing services. The computer device and the wheel-legged robot may be connected through a physical line, a network, or the like. For example, referring to FIG. 1, a computer device 101 may control, based on data corresponding to a predicted posture through a network 102, a wheel-legged robot 103 to move. For example, the computer device 101 may adjust an included angle 106 between an inner mechanical leg 104 and an outer mechanical leg 105 of the wheel-legged robot 103 based on the data corresponding to the predicted posture, to change a support region of the wheel-legged robot 103.

In some embodiments, the computer device may be the wheel-legged robot itself. The operations in some embodiments are performed by the wheel-legged robot. For example, referring to FIG. 1, the computer device 101 may transmit the data corresponding to the predicted posture to the wheel-legged robot 103 through the network 102, and the wheel-legged robot 103 moves based on the data corresponding to the predicted posture. In some embodiments, the wheel-legged robot 103 may automatically adjust the support region thereof according to a real environment, to perform different tasks in the real environment. This is not limited.

In a method for controlling a wheel-legged robot provided in some embodiments, through adjustment of an included angle between an inner mechanical leg and an outer mechanical leg, a support region of the wheel-legged robot can be adjusted to a predicted size, for performing a specified task. For example, the support region of the wheel-legged robot is adjusted to a large support region, for transporting a heavy object. For another example, the support region of the wheel-legged robot is adjusted to a small support region, for passing through narrow space (such as a corridor). Some embodiments also support adjusting a height of a body of the wheel-legged robot to a predicted height, for performing a specified task. For example, the height of the body of the wheel-legged robot is adjusted to the predicted height, for grabbing a high-positioned object. In some embodiments, a conflict problem between a large load and flexible movement of the wheel-legged robot can be resolved, and a problem of how a single wheel-legged robot can expand operating space can also be resolved, which may increase the capability of the wheel-legged robot for adapting to an environment and which may expand the scope of applications for the wheel-legged robot.

In some embodiments, the wheel-legged robot in some embodiments includes a body, and two outer mechanical legs and at least one inner mechanical leg, for example, two outer mechanical legs and two inner mechanical legs (for example, the wheel-legged robot is a quadruped wheel-legged robot) or two outer mechanical legs and one inner mechanical leg (for example, the wheel-legged robot is a tripedal wheel-legged robot), that are connected to the body through hip joints. A hip joint corresponding to the at least one inner mechanical leg is located between hip joints corresponding to the two outer mechanical legs, and a rotation center of the hip joint corresponding to the outer mechanical leg and a rotation center of the hip joint corresponding to the inner mechanical leg are located on a same vertical plane. The wheel-legged robot may stand on a support surface through the outer mechanical leg and the inner mechanical leg. The wheel-legged robot may glide on the support surface through a foot wheel on the outer mechanical leg and a foot wheel on the inner mechanical leg.

Figure 2:
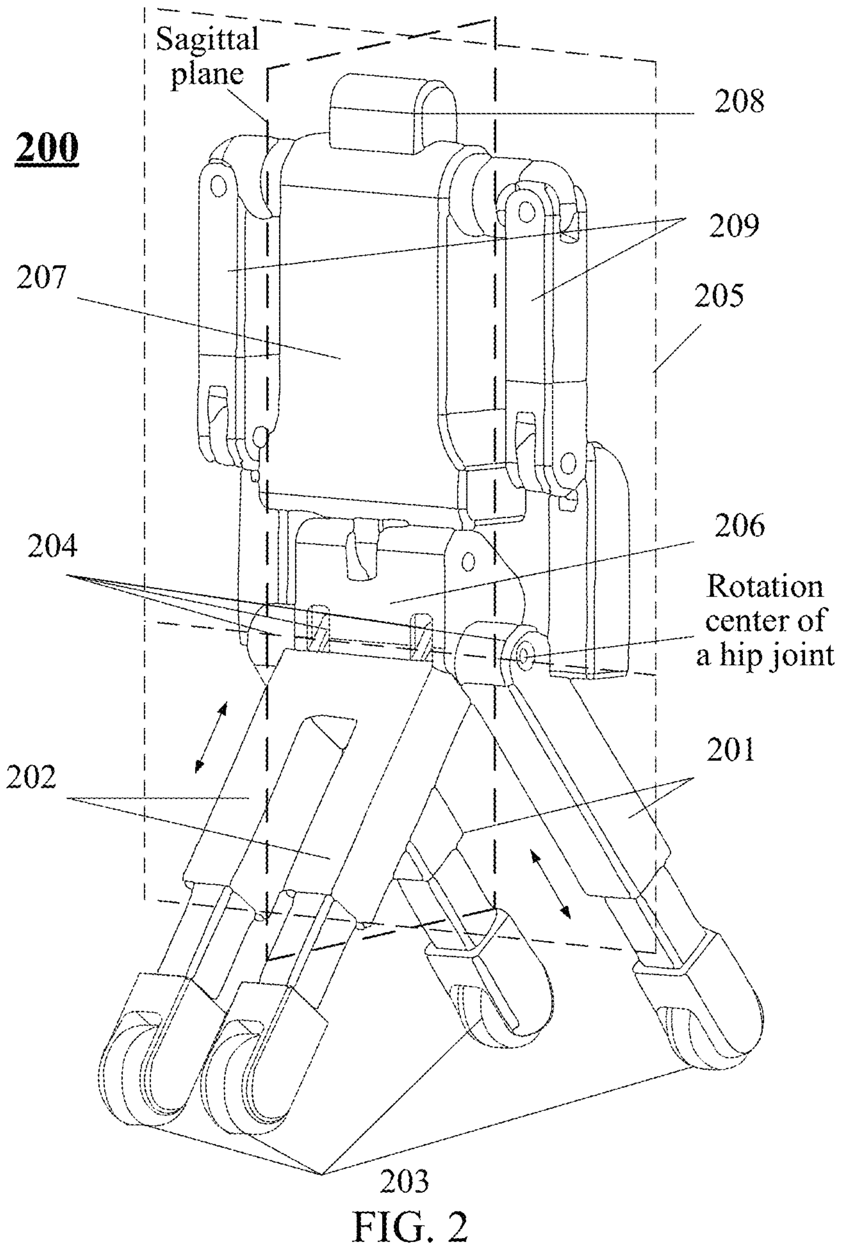
FIG. 2 is a schematic diagram of a quadruped wheel-legged robot according to some embodiments.

For example, FIG. 2 is a schematic diagram of a structure of a quadruped wheel-legged robot. A quadruped wheel-legged robot 200 may include a body, hip joints, and mechanical legs.

The quadruped wheel-legged robot 200 includes four mechanical legs: two outer mechanical legs 201 and two inner mechanical legs 202. The two inner mechanical legs 202 are located between the two outer mechanical legs 201, and each of the four mechanical legs can separately expand and contract in a direction shown in the figure. Each of the four mechanical legs is mounted with one foot wheel 203 at one end, and each foot wheel 203 can be separately driven. The quadruped wheel-legged robot 200 may stand through the two inner mechanical legs 202 or the two outer mechanical legs 201, to be in a bipedal wheel support state; or the quadruped wheel-legged robot 200 may stand through the two inner mechanical legs 202 and the two outer mechanical legs 201 to be in a quadruped wheel support state. This is not limited.

In some embodiments, the two inner mechanical legs 202 may be implemented as a whole. In other words, the quadruped wheel-legged robot 200 may be implemented as a tripedal wheel-legged robot with only one inner mechanical leg.

The other end of each of the four mechanical legs is connected to one hip joint 204, and each mechanical leg may rotate around the respective hip joint 204 and maintain linkage. In some embodiments, rotation centers of the hip joints 204 corresponding to the quadruped wheel-legged robot 200 are located on a same vertical plane 205, and rotation planes of the mechanical legs corresponding to the quadruped wheel-legged robot 200 are parallel. Hip joints 204 corresponding to the two inner mechanical legs 202 are located between hip joints 204 corresponding to the two outer mechanical legs 201.

In some embodiments, the hip joints 204 corresponding to the quadruped wheel-legged robot 200 may be coaxial. In other words, the rotation centers of the hip joints 204 are located on a same straight line. The hip joints 204 corresponding to the quadruped wheel-legged robot may be not coaxial. For example, the hip joints 204 corresponding to the two inner mechanical legs 202 are coaxial, and the hip joints 204 corresponding to the two outer mechanical legs 201 are coaxial, but the hip joints 204 corresponding to the two inner mechanical legs 202 and the hip joints 204 corresponding to the two outer mechanical legs 201 are not coaxial.

In some embodiments, the hip joints 204 corresponding to the two outer mechanical legs 201 share one drive motor, to cause the two outer mechanical legs 201 to synchronously move; and the hip joints 204 corresponding to the two inner mechanical legs 202 share one drive motor, to cause the two inner mechanical legs 202 to synchronously move. In some embodiments, the hip joints 204 corresponding to the quadruped wheel-legged robot 200 may be independently driven by respective corresponding drive motors. This is not limited.

The body of the quadruped wheel-legged robot 200 may include a waist 206, a trunk 207, a head 208, and upper limbs 209.

The hip joints 204 corresponding to the quadruped wheel-legged robot 200 are connected to a same end of the waist 206, and the other end of the waist 206 is connected to an end of the body 207. The waist 206 includes two rotation centers: a pitch rotation center enabling the trunk 207 to pitch, and a yaw rotation center enabling the trunk 207 to yaw. A design that the yaw rotation center is connected in series with the pitch rotation center is maintained. The yaw rotation center is located at an upper end of the pitch rotation center, and is connected to the trunk 207.

Another end of the trunk 207 is connected to the head 208 and the upper limbs 209. The upper limbs 209 may be multi-degree of freedom upper limbs. In some embodiments, an end actuator such as a mechanical gripper or a suction cup is disposed on the upper limb 209. A data collection device such as an image collection device or a video photographing device may be disposed in the head 208 to perceive the real environment.

In some embodiments, the foot wheels, the mechanical legs, the hip joints, and the waist of the quadruped wheel-legged robot 200 are necessary hardware for a control algorithm, and the rest are non-necessary hardware.

Compared with a bipedal wheel-legged robot, the quadruped wheel-legged robot has a more stable structure and a stronger capability in resisting external impact disturbance. Compared with a hexapod wheel-legged robot, the quadruped wheel-legged robot includes fewer redundant joints and lower design complexity. The quadruped wheel-legged robot can not only bear a large load, but also pass through narrow space, and can further perform tasks on objects of different heights. The quadruped wheel-legged robot has a stronger capability in adapting to the environment.

An exemplary description is made below for application scenarios of the wheel-legged robot according to some embodiments.

In some embodiments, in a scenario that the wheel-legged robot may bear a large load, the included angle between the inner mechanical leg and the outer mechanical leg may be adjusted, to enlarge the support region of the wheel-legged robot. Because the support region is large enough, the wheel-legged robot has better stability under the large load. When the load is offset from a center of the wheel-legged robot, the wheel-legged robot may not be prone to tip over. The two outer mechanical legs of the wheel-legged robot synchronously move, the inner mechanical legs synchronously move, and a length of the mechanical leg of the wheel-legged robot remains unchanged during a change of the support region.

Figure 3:
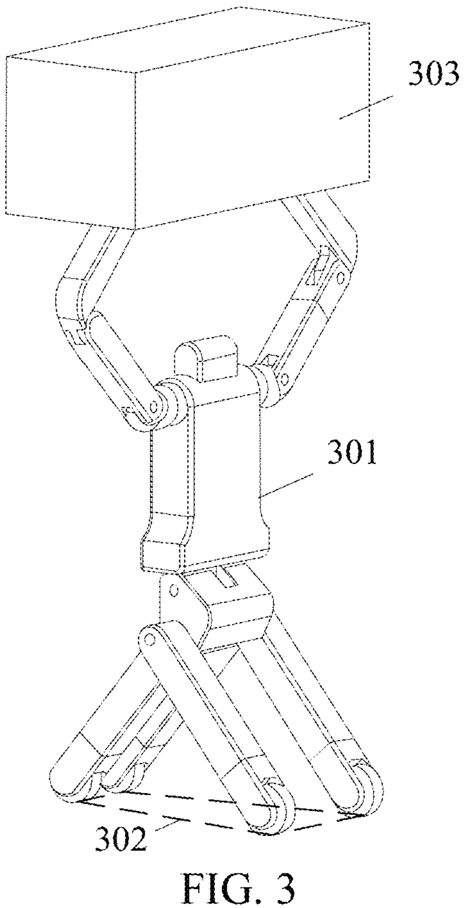
FIG. 3 is a schematic diagram of a wheel-legged robot transporting a heavy object according to some embodiments.
Figure 4:
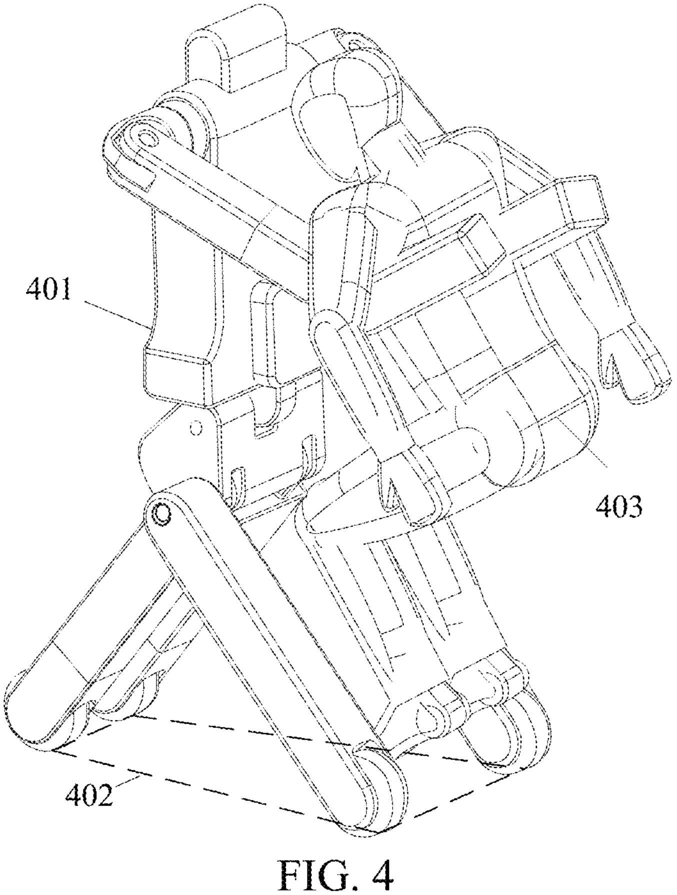
FIG. 4 is a schematic diagram of a wheel-legged robot holding a person according to some embodiments.
Figure 5:
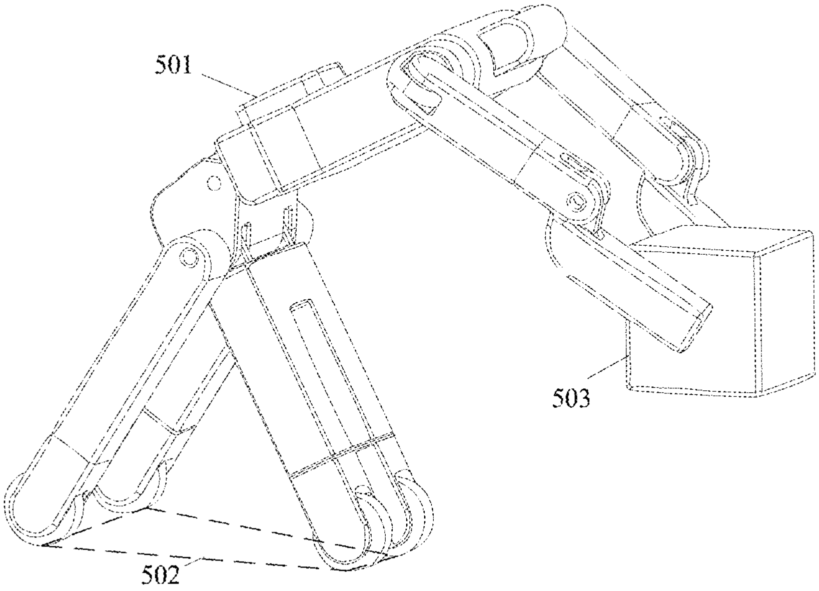
FIG. 5 is a schematic diagram of a wheel-legged robot picking up an object according to some embodiments.

For example, referring to FIG. 3, if a heavy object 303 is to be transported, a wheel-legged robot 301 may enlarge a support region 302 corresponding to the wheel-legged robot 301, to transport the heavy object 303 more stably. For another example, referring to FIG. 4, when holding a person 403 through upper limbs, a wheel-legged robot 401 may also enlarge a support region 402 corresponding to the wheel-legged robot 401, to hold the person 403 more stably. For another example, referring to FIG. 5, an object 503 is offset from a center of a wheel-legged robot 501, and the wheel-legged robot 501 may enlarge a support region 502, to stand on a support surface more stably to pick up the object 503 and be not prone to tip over.

In some embodiments, if the wheel-legged robot is to move in a narrow environment, the wheel-legged robot may reduce the support region of the wheel-legged robot by adjusting the included angle between the inner mechanical leg and the outer mechanical leg. Because the support region of the wheel-legged robot is small and an occupied area of the wheel-legged robot is small, so that the wheel-legged robot can enter small space (such as a kitchen or a small warehouse) to complete a task. Because the support region is small and a turning radius of the wheel-legged robot is small, so that the wheel-legged robot can turn more in a narrow corridor (such as a subway gate or a residential corridor), thereby expanding a range of reachable space of the wheel-legged robot.

Figure 6:
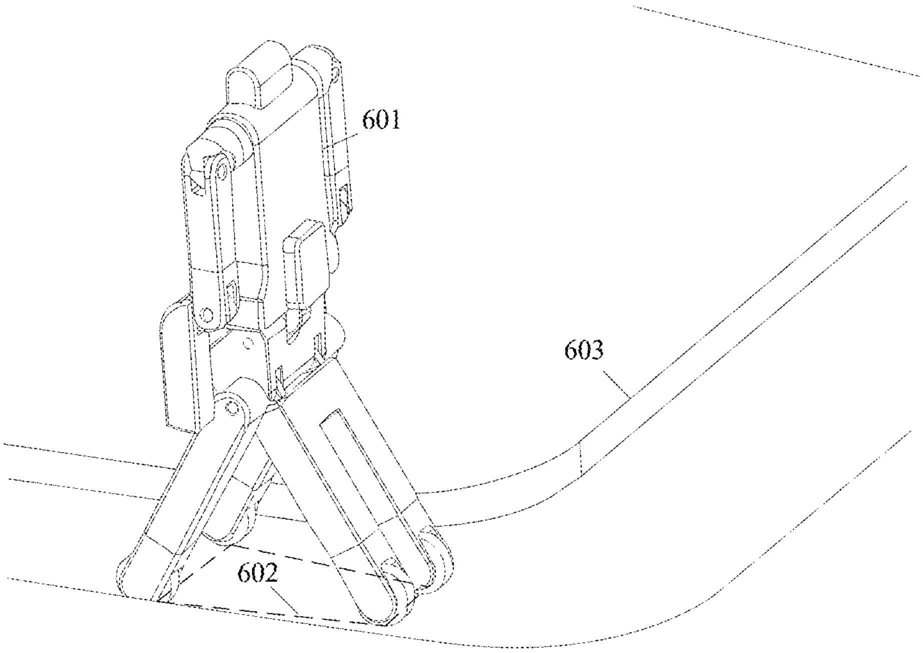
FIG. 6 is a schematic diagram of a wheel-legged robot passing through a curve according to some embodiments.

For example, referring to FIG. 6, when a wheel-legged robot 601 may pass through a curve of a corridor 603, the wheel-legged robot 601 may reduce a turning radius by reducing a support region 602, to pass through the curve of the corridor 603.

In some embodiments, the support region of the wheel-legged robot may become zero. In other words, the inner mechanical leg and the outer mechanical leg overlap, and the wheel-legged robot enters a bipedal wheel support state. The quadruped wheel-legged robot becomes the bipedal wheel-legged robot. The wheel-legged robot can be used in all scenarios, such as two-wheel balancing for object transportation and two-wheel balancing for an upper limb operation, in which the bipedal wheel-legged robot can be used. The wheel-legged robot in the bipedal wheel support state can achieve zero turning radius, for example, turn on the spot, which may increase flexibility of the wheel-legged robot.

Figure 7:
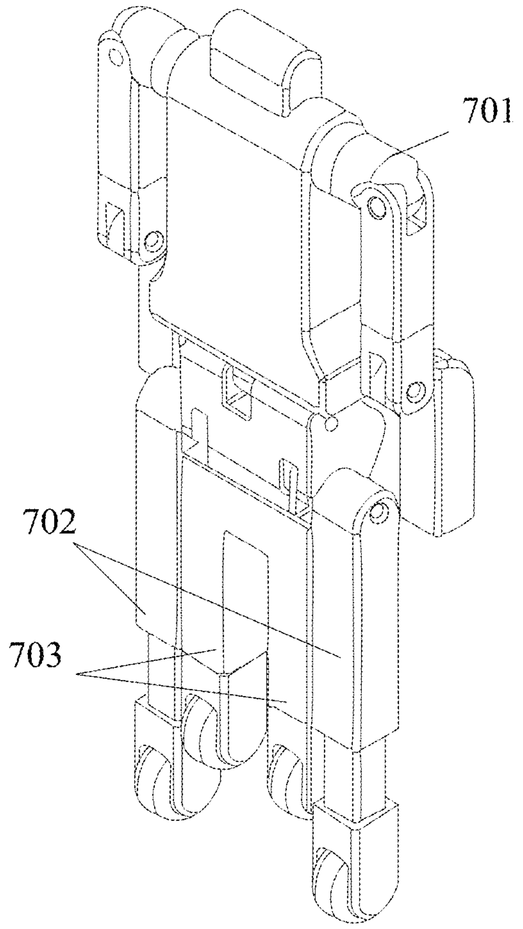
FIG. 7 is a schematic diagram of a wheel-legged robot in a bipedal wheel support state according to some embodiments.

For example, referring to FIG. 7, a wheel-legged robot 701 is in a bipedal wheel support state, and stands on a support surface through foot wheels on two outer mechanical legs 702. Two inner mechanical legs 703 of the wheel-legged robot 701 are in a retracted state, in other words, foot wheels corresponding to the inner mechanical legs 703 are not in contact with a floor.

In some embodiments, in a process in which the wheel-legged robot adjusts the support region, if a leg length of the mechanical leg is not changed, a height of the wheel-legged robot is changed accordingly, thereby expanding movement space of the upper limbs of the wheel-legged robot and further helping the wheel-legged robot to complete some operation tasks, such as grabbing a high-positioned object and picking up an object on a floor.

Figure 8:
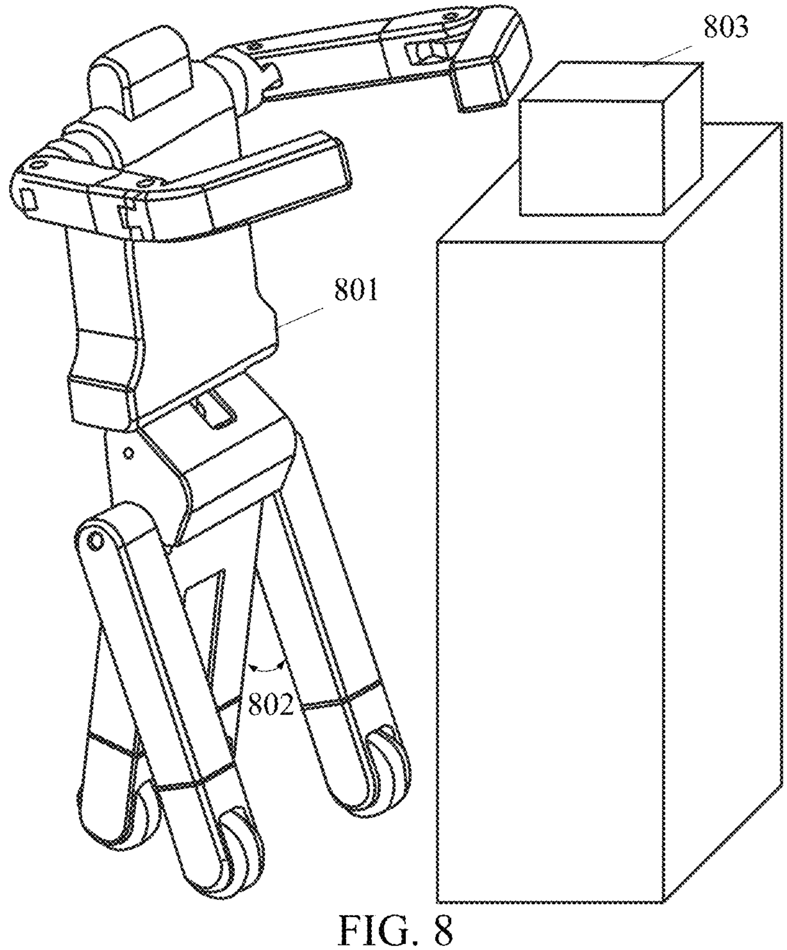
FIG. 8 is a schematic diagram of a wheel-legged robot grabbing a high-positioned object according to some embodiments.

For example, referring to FIG. 8, in a case that a length of a mechanical leg is not changed, an included angle 802 between an inner mechanical leg and an outer mechanical leg is reduced, to reduce a support region of a wheel-legged robot 801, so that a height of the wheel-legged robot 801 in a vertical direction is increased, and the wheel-legged robot 801 can grab a high-positioned object 803.

Figure 9:
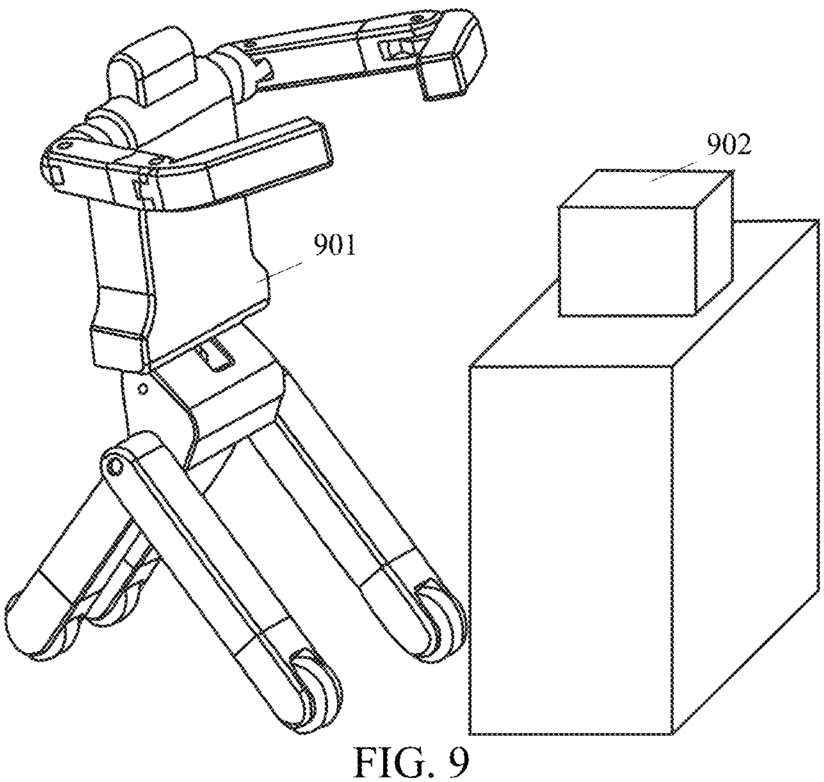
FIG. 9 is a schematic diagram of a wheel-legged robot picking up a low-positioned object according to some embodiments.

For another example, referring to FIG. 9, if a current height of a wheel-legged robot 901 disables the wheel-legged robot 901 to pick up an object 902 on a table top, the height can be increased to enable the wheel-legged robot 901 to pick up the object 902 in a pitch state. The height can be decreased to enable upper limbs of the wheel-legged robot 901 to be in contact with the object 902, so that the wheel-legged robot 901 picks up the object 902.

The method for controlling a wheel-legged robot provided in some embodiments is described below.

Figure 10:
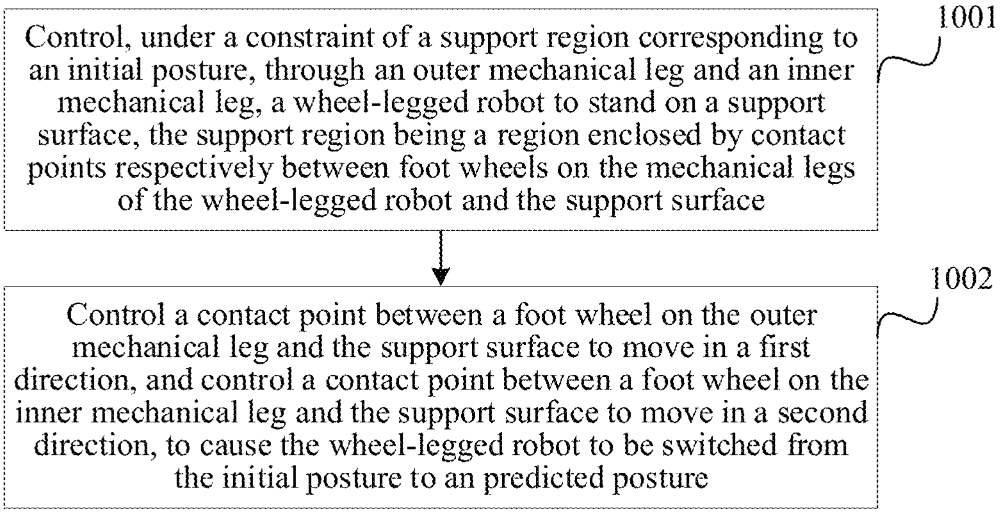
FIG. 10 is a flowchart of a method for controlling a wheel-legged robot according to some embodiments.

FIG. 10 is a flowchart of a method for controlling a wheel-legged robot according to some embodiments. In some embodiments, an example in which operations are performed by the wheel-legged robot is used, for description of the method for controlling a wheel-legged robot. The method may include the following operations (1001 and 1002).

Operation 1001: Control, under a constraint of a support region corresponding to an initial posture, through an outer mechanical leg and an inner mechanical leg, the wheel-legged robot to stand on a support surface, the support region being a region enclosed by contact points respectively between foot wheels on the mechanical legs of the wheel-legged robot and the support surface.

The initial posture in some embodiments is an initial posture of the wheel-legged robot. The initial posture is configured for describing an initial state of the wheel-legged robot in task space, and mainly includes initial postures of the mechanical legs of the wheel-legged robot, such as an included angle between the outer mechanical leg and the inner mechanical leg, locations of foot wheels on the mechanical legs, a location relationship between the mechanical leg and a waist, a location relationship between the mechanical leg and the support surface, a length of the mechanical leg, and an angular velocity of the foot wheel.

The foregoing initial posture may further include an initial posture of a body of the wheel-legged robot.

In some embodiments, the initial posture may be a non-bipedal wheel support state. In other words, each foot wheel of the wheel-legged robot in the initial state is in contact with the support surface. For example, in a case that the wheel-legged robot is the foregoing quadruped wheel-legged robot, the initial posture may be a quadruped wheel support state; and in a case that the wheel-legged robot is the foregoing tripedal wheel-legged robot, the initial posture may be a tripedal wheel support state. The support surface may include one plane, such as a flat floor or a road, or may include a plurality of planes of different heights, such as a corridor. This is not limited. In some embodiments, the initial posture may be a bipedal wheel support state, but may be switched to the non-bipedal wheel support state before the support region is adjusted.

The initial posture may be set and adjusted according to an actual use requirement. This is not limited. In some embodiments, when the wheel-legged robot performs a task, each current posture of the wheel-legged robot may be used as an initial posture at a future moment. The future moment is a moment after a current moment.

The support region may be configured for constraining relative locations of the foot wheels of the wheel-legged robot. For example, relative locations of the foot wheels of the wheel-legged robot in the initial posture are to satisfy the constraint of the support region corresponding to the initial posture. For example, in a case that the wheel-legged robot includes two outer mechanical legs and two inner mechanical legs, for the wheel-legged robot in the initial state, a region enclosed by contact points respectively between foot wheels on the two outer mechanical legs and the support surface and contact points respectively between foot wheels on the two inner mechanical legs and the support surface satisfies a constraint of a support region corresponding to the initial state. In a case that the wheel-legged robot includes two outer mechanical legs and one inner mechanical legs, for the wheel-legged robot in the initial state, a region enclosed by contact points respectively between foot wheels on the two outer mechanical legs and the support surface and a contact point between a foot wheel on the inner mechanical leg and the support surface satisfies a constraint of a support region corresponding to the initial state.

Because each mechanical leg of the wheel-legged robot in some embodiments has one degree of freedom, in a case that relative locations between the foot wheels are determined, relative locations between the mechanical legs may also be determined, and relative locations between the mechanical legs and the waist may also be determined. This facilitates reducing complexity of adjusting the support region.

For example, referring to FIG. 6, under a constraint of a support region 602 corresponding to an initial posture, locations of foot wheels of a wheel-legged robot 601 may be determined, so that locations of mechanical legs of the wheel-legged robot 601 may be determined. The wheel-legged robot 601 can stand on a support surface in the initial posture.

Operation 1002: Control a contact point between a foot wheel on the outer mechanical leg and the support surface to move in a first direction, and control a contact point between a foot wheel on the inner mechanical leg and the support surface to move in a second direction, to cause the wheel-legged robot to be switched from the initial posture to a predicted posture.

In some embodiments, two outer mechanical legs of the wheel-legged robot synchronously move, and in a case that the wheel-legged robot includes at least two inner mechanical legs, the inner mechanical legs also synchronously move. The support region of the wheel-legged robot can be flexibly adjusted in a case that the body of the wheel-legged robot remains unchanged (for example, the body is in a stable posture, and synchronously moves with the mechanical legs without additional adjustment).

In some embodiments, the length of the mechanical leg of the wheel-legged robot remains unchanged during a change of the support region. A height of the body of the wheel-legged robot can be flexibly adjusted in a case that the body of the wheel-legged robot remains unchanged. Because an influence of a change of a leg length of the mechanical leg on the support region may not be considered, complexity of adjusting the support region is further reduced.

In some embodiments, when the support region of the wheel-legged robot is adjusted, to ensure that the wheel-legged robot can stably stand on the support surface, the foregoing first direction may be opposite to the second direction.

Figure 11:
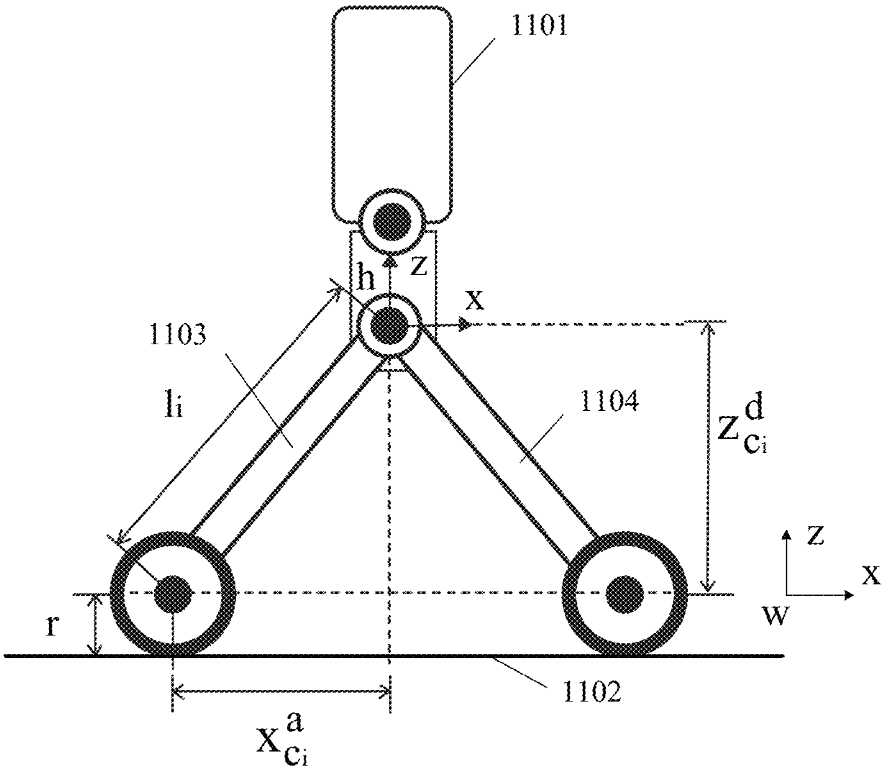
FIG. 11 is a schematic diagram of a planar model of a wheel-legged robot according to some embodiments.

Some embodiments may be simplified to adjusting the included angle between the outer mechanical leg and the inner mechanical leg, to adjust the support region and the height of the body. In some embodiments, the adjustment of the support region is performed mainly on a sagittal plane (for example, a symmetrical plane of the wheel-legged robot), so that the wheel-legged robot may be abstracted as a plane model. For example, referring to FIG. 11, a plane model 1101 of a wheel-legged robot stands on a support surface 1102, and a support region can be adjusted by adjusting an included angle between an outer mechanical leg 1103 and an inner mechanical leg 1104. Hip joints of the wheel-legged robot are coaxial. Complexity of a structure of the wheel-legged robot is further reduced, thereby facilitating reducing complexity of adjusting the support region.

Figure 12:
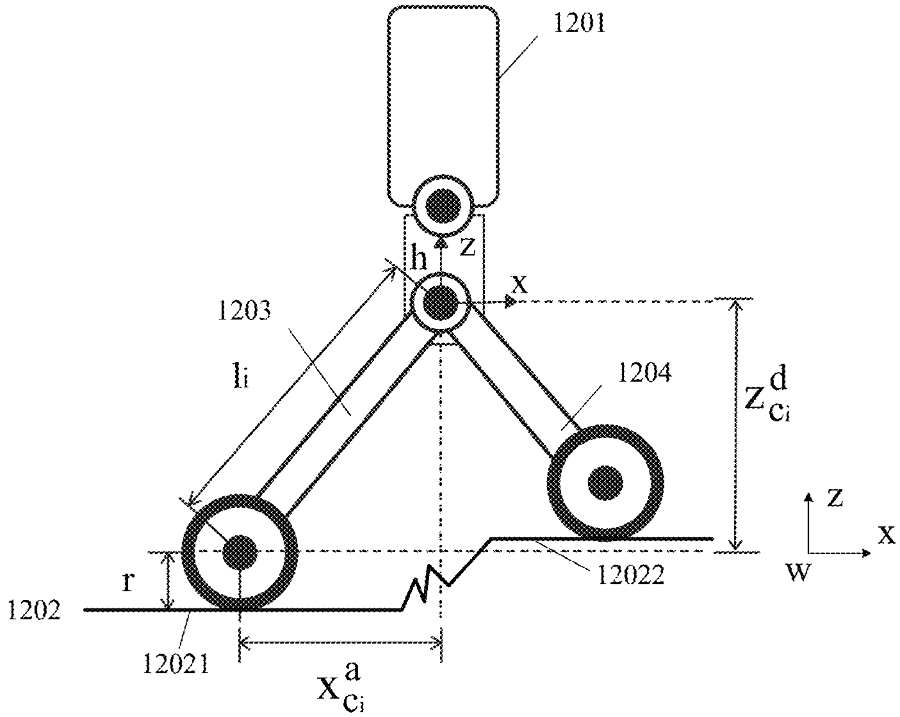
FIG. 12 is a schematic diagram of a planar model of a wheel-legged robot according to some embodiments.

For another example, referring to FIG. 12, a plane model 1201 of a wheel-legged robot stands on a support surface 1202, and the support surface 1202 includes a sub-support surface 12021 and a sub-support surface 12022. A foot wheel on an outer mechanical leg 1203 is in contact with the sub-support surface 12021, and a foot wheel on an inner mechanical leg 1204 is in contact with the sub-support surface 12022. A support region can be adjusted by adjusting an included angle between the outer mechanical leg 1203 and the inner mechanical leg 1204.

Figure 13:
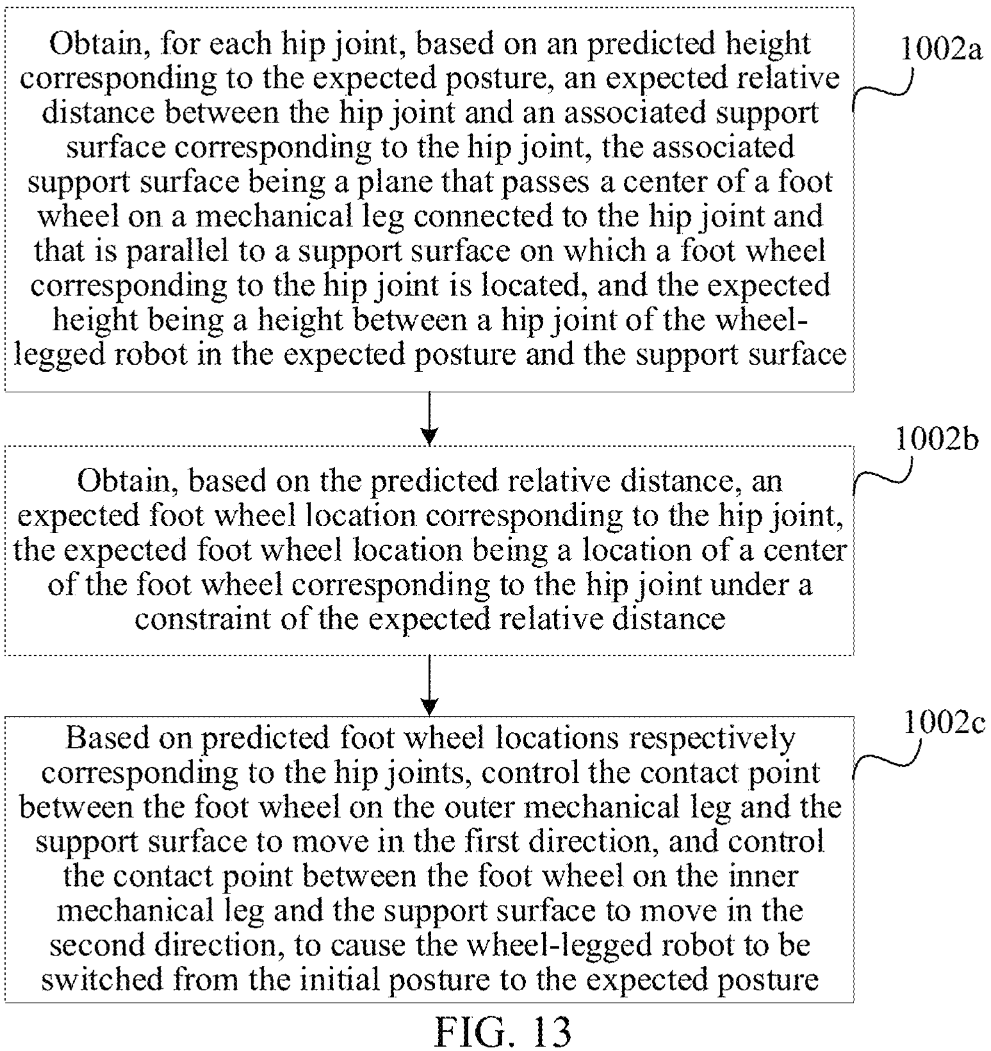
FIG. 13 is a flowchart of a method for controlling a wheel-legged robot according to some embodiments.

In some embodiments, the height of the body may be equivalently replaced by a height of the hip joint. In a case that the leg length of the wheel-legged robot is unchanged, because the height of the body may be equivalently replaced by the included angle between the outer mechanical leg and the inner mechanical leg, and the height of the hip joint may be equivalently replaced by the included angle between the outer mechanical leg and the inner mechanical leg, the wheel-legged robot may control, based on a predicted height of the hip joint, the mechanical legs to move, to complete the adjustment of the support region, thereby reducing difficulty in adjusting the support region. A height for a task can be satisfied, thereby expanding working space of the upper limbs of the wheel-legged robot. Referring to FIG. 13, the foregoing operation 1002 may further include the following several sub-operations.

Operation **1002*a***: Obtain, for each hip joint, based on a predicted height corresponding to the predicted posture, a predicted relative distance between the hip joint and an associated support surface corresponding to the hip joint, the associated support surface being a plane that passes a center of a foot wheel on a mechanical leg connected to the hip joint and that is parallel to a support surface on which a foot wheel corresponding to the hip joint is located, and the predicted height being a height between a hip joint of the wheel-legged robot in the predicted posture and the support surface.

The predicted posture may be a posture corresponding to a support region in a predicted size, and the predicted size may be determined based on the predicted height. The predicted height may be set by a user, or may be set by the wheel-legged robot according to a real environment. This is not limited.

The predicted relative distance is a relative distance between a hip joint of the wheel-legged robot in the predicted posture and an associated support surface corresponding to the hip joint, and may be represented by using a length of a perpendicular line from a rotation center of the hip joint to the associated support surface.

For example, referring to FIG. 12, an example in which a predicted relative distance corresponding to a hip joint of the outer mechanical leg 1203 is obtained is used. The outer mechanical leg 1203 corresponds to the sub-support surface 12021, so that a height between the hip joint corresponding to the outer mechanical leg 1203 and the sub-support surface 12021 may be obtained based on the predicted height, and the predicted relative distance $$z_{c_i}^d$$

corresponding to the hip joint may be obtained by subtracting a radius r of the foot wheel from the height, where d represents a predicted value, and $c_i$ represents a foot wheel (for example, the foot wheel corresponding to the outer mechanical leg 1203) corresponding to an $i^{th}$ mechanical leg. Predicted relative distances respectively corresponding to the hip joints may be obtained by using the same method.

Operation 1002*b*: Obtain, based on the predicted relative distance, a predicted foot wheel location corresponding to the hip joint, the predicted foot wheel location being a location of a center of the foot wheel corresponding to the hip joint under a constraint of the predicted relative distance.

In some embodiments, leg lengths of the two outer mechanical legs are the same, leg lengths of the inner mechanical legs are the same, and the leg length of the outer mechanical leg and the leg length of the inner mechanical leg may be the same or may be different. This is not limited. The predicted foot wheel location is a location that a foot wheel of the wheel-legged robot in the predicted posture is predicted to reach.

In some embodiments, a process of obtaining the predicted foot wheel location may be as follows: obtaining a leg length of a mechanical leg connected to the hip joint; and obtaining, based on the leg length and the predicted relative distance, the predicted foot wheel location corresponding to the hip joint.

For example, referring to FIG. 12, the leg length $l_i$, the predicted relative distance $$z_{c_i}^d,$$

and the predicted foot wheel location $$x_{c_i}^d$$

form a right triangle. If the leg length $l_i$ and the predicted relative distance $$z_{c_i}^d$$

are known, the predicted foot wheel location $$x_{c_i}^d$$

may be represented as follows:

$$x_{c_i}^d = \pm\sqrt{\left(l_i^2 - z_{c_i}^{d2}\right)},$$

where $l_i$ is a leg length of a mechanical leg to which an $i^{th}$ foot wheel belongs. The predicted foot wheel location may be obtained according to a simple Pythagorean theorem, further reducing difficulty in adjusting the support region.

In some embodiments, in a case that the foot wheel corresponding to the hip joint is located on a right side of a vertical plane, the predicted foot wheel location corresponding to the hip joint is a positive value, to represent that a contact point between the foot wheel and the support surface may move to the right side of the vertical plane; or in a case that the foot wheel corresponding to the hip joint is located on a left side of a vertical plane, the predicted foot wheel location corresponding to the hip joint is a negative value, to represent that a contact point between the foot wheel and the support surface may move to the left side of the vertical plane. A movement direction of the foot wheel is represented by using a positive/negative value, thereby simplifying representation of the predicted foot wheel location and facilitating reducing difficulty in adjusting the support region.

For example, referring to FIG. 12, the outer mechanical leg 1203 is located on the left side of the vertical plane, and a negative value may be assigned to the predicted foot wheel location corresponding to the hip joint corresponding to the outer mechanical leg 1203. The inner mechanical leg 1204 is located on the right side of the vertical plane, and a positive value may be assigned to a predicted foot wheel location corresponding to a hip joint corresponding to the inner mechanical leg 1204. The positive/negative value is configured for representing that the first direction is opposite to the second direction.

In some embodiments, a hip joint coordinate system is constructed with a geometric center of a rotation center of each hip joint as an origin. A direction of a coordinate axis of the hip joint coordinate system may be consistent with a direction of a world coordinate system, or may be rotated relative to the world coordinate system. This is not limited. An x-axis of the world coordinate system is parallel to the support surface, and a z-axis of the world coordinate system is perpendicular to the support surface.

The predicted foot wheel location is configured for representing a relative location between the foot wheel and the hip joint. Coordinates of the foot wheel in the hip joint coordinate system may be determined based on the predicted foot wheel location, to represent the predicted foot wheel location. After coordinates of each foot wheel in the hip joint coordinate system and coordinates of each hip joint in the hip joint coordinate system are obtained, the coordinates may be converted to the world coordinate system, to perform control planning based on a whole-body dynamic equation of the wheel-legged robot. A planning method is described in detail below.

Operation 1002*c*: Based on predicted foot wheel locations respectively corresponding to the hip joints, control the contact point between the foot wheel on the outer mechanical leg and the support surface to move in the first direction, and control the contact point between the foot wheel on the inner mechanical leg and the support surface to move in the second direction, to cause the wheel-legged robot to be switched from the initial posture to the predicted posture.

In some embodiments, the contact point between the foot wheel on the outer mechanical leg and the support surface is controlled to move in the first direction, so that the foot wheel on the outer mechanical leg reaches a corresponding predicted foot wheel location. The contact point between the foot wheel on the inner mechanical leg and the support surface is controlled to move in the second direction, so that the foot wheel on the inner mechanical leg reaches a corresponding predicted foot wheel location. The wheel-legged robot can be controlled to be switched from the initial posture to the predicted posture.

In some embodiments, operation 1002*c* may include the following content.

1. For each hip joint, based on the predicted foot wheel location corresponding to the hip joint and a current foot wheel location, a foot wheel reference track corresponding to the hip joint is obtained. The foot wheel reference track is configured for guiding the foot wheel corresponding to the hip joint to move from the current foot wheel location to the predicted foot wheel location.

To enable each foot wheel to smoothly move to a predicted location from a current location, reference location interpolation may be performed between the current foot wheel location and the predicted foot wheel location. For example, interpolation may be performed on the predicted foot wheel location corresponding to the hip joint and the current foot wheel location by using a spline curve interpolation method, to obtain the foot wheel reference track corresponding to the hip joint. The foot wheel reference track includes reference locations of the foot wheel corresponding to the hip joint at a plurality of future moments. A reference location at a future moment is a location that the foot wheel may reach at the future moment, and a quantity of reference locations (for example, a quantity of future moments) may be set and adjusted according to an actual use requirement. The current foot wheel location may be a location of the foot wheel in the initial state.

For example, that a cubic spline curve interpolation method is used is used as an example. The foot wheel reference track may be represented as follows:

$$x^r_{c_i}(t) = a_{0_i} + a_{1_i}t + a_{2_i}t^2 + a_{3_i}t^3,\ t \in [0, T],$$

where if t is greater than 0, t is configured for representing a future moment; if t is equal to 0, t is configured for representing a current moment; T is a total quantity of future moments, to represent continuous duration of whole movement;

$$x^r_{c_i}(t)$$

represents a reference location of a foot wheel corresponding to an $i^{th}$ hip joint at a future moment t; and $a_{0_i}$, $a_{1_i}$, $a_{2_i}$, and $a_{3_i}$ are coefficients. In some embodiments, the reference location may be represented by using an x-axis coordinate in the word coordinate system.

A constraint condition of the foregoing cubic spline curve interpolation method is as follows:

$$x^r_{c_i}(0) = a_{0_i} = x^a_{c_i};$$

$$x^r_{ci}(T) = a_{0_i} + a_{1_i}T + a_{2_i}T^2 + a_{3_i}T^3 = x^d_{ci};$$

$$\dot{x}^r_{c_i}(0) = a_{1i} = 0; \text{ and}$$

$$\dot{x}^r_{ci}(T) = a_{1i} + 2a_{2_i}T + 3a_{3_i}T^2 = 0.$$

2. Based on foot wheel reference tracks respectively corresponding to the hip joints, a predicted acceleration track corresponding to the support region of the wheel-legged robot is determined.

The predicted acceleration track may be a predicted acceleration track corresponding to a center of the support region, and may include predicted acceleration of the center of the support region at a plurality of future moments. Each foot wheel is adjusted with a change of the center of the support region without calculating the reference locations of the foot wheels one by one, thereby facilitating reducing an amount of calculation during the adjustment of the support region and further reducing difficulty in adjusting the support region. The predicted acceleration is a velocity predicted to be reached.

In some embodiments, a process of obtaining the predicted acceleration track may be as follows.

(1) Based on the foot wheel reference tracks respectively corresponding to the hip joints, a central reference track corresponding to the support region of the wheel-legged robot is determined. The central reference track is configured for guiding the center of the support region of the wheel-legged robot to move.

In some embodiments, for each future moment, respective reference locations of the foot wheels corresponding to the hip joints at the future moment are obtained; and the respective reference locations of the foot wheels corresponding to the hip joints at the future moment are averaged, to obtain a reference location of the center of the support region at the future moment.

For example, because mass distribution of the wheel-legged robot is uniform, a reference location of the center of the support region at the future moment t may be represented as follows:

$$x^r_c(t) = \frac{\sum_{i=1}^{n} x^r_{c_i}(t)}{n},$$

where n≥3 is a total quantity of foot wheels of the wheel-legged robot.

(2) The predicted acceleration track is determined based on the central reference track.

In some embodiments, the predicted acceleration track may be obtained by using a proportion-differentiation (PD) controller, which may facilitate stability of adjusting the support region and increasing a response velocity of adjusting the support region. For example, for each future moment corresponding to the central reference track, a difference between a real location of the center of the support region at the future moment and the reference location of the center of the support region at the future moment is calculated, to obtain a first difference; a difference between a real velocity of the center of the support region at the future moment and a reference velocity of the center of the support region at the future moment is calculated, to obtain a second difference; the first difference and a proportional coefficient corresponding to the PD controller are multiplied, to obtain a first product; the second difference and a differential coefficient corresponding to the PD controller are multiplied, to obtain a second product; and the first product and the second product are added, to obtain predicted acceleration of the center of the support region at the future moment.

For example, predicted acceleration of the center of the support region at the future moment t may be represented as follows:

$$\ddot{x}_c^d(t) = k_p(x_c^r(t) - x_c^a(t)) + k_d(\dot{x}_c^r(t) - \dot{x}_c^a(t)),$$

where $k_p$ is a proportional coefficient corresponding to the PD controller, $k_d$ is a differential coefficient corresponding to the PD controller, $$x_c^r(t)$$

is a real location of the center of the support region at the future moment, $$x_c^a(t)$$

is a reference location of the center of the support region at the future moment, $$\dot{x}_c^r(t)$$

is a real velocity of the center of the support region at the future moment, and $$\dot{x}_c^a(t)$$

is a reference velocity of the center of the support region at the future moment.

3. Based on the predicted acceleration track, the contact point between the foot wheel on the outer mechanical leg and the support surface is controlled to move in the first direction, and the contact point between the foot wheel on the inner mechanical leg and the support surface is controlled to move in the second direction, to cause the wheel-legged robot to be switched from the initial posture to the predicted posture.

In some embodiments, movement of a contact point between a foot wheel and the support surface may depend on rotation of a hip joint corresponding to the foot wheel and rotation of the foot wheel. In other words, for a foot wheel, joint torque of a hip joint corresponding to the foot wheel and joint torque of the foot wheel may be obtained, or joint acceleration of a hip joint corresponding to the foot wheel and joint acceleration of the foot wheel may be obtained.

In some embodiments, the process may include the following content.

(1) The predicted acceleration track is substituted into a whole-body dynamic equation corresponding to the wheel-legged robot, and the equation is solved to obtain a joint torque sequence and a joint acceleration sequence that correspond to the wheel-legged robot. The joint torque sequence includes a joint torque corresponding to each hip joint and a joint torque corresponding to each foot wheel, and the joint acceleration sequence includes joint acceleration corresponding to each hip joint and joint acceleration corresponding to each foot wheel.

The whole-body dynamic equation of the wheel-legged robot may be configured for representing association between joints of the wheel-legged robot. For example, the whole-body dynamic equation of the wheel-legged robot may be represented as follows:

$$\begin{bmatrix} H & -S^T & -J_c^T \\ J_t & 0_{n_t \times n_j} & 0_{n_t \times n_c} \end{bmatrix} \begin{bmatrix} \ddot{q} \\ \tau \\ f \end{bmatrix} \begin{bmatrix} -C \\ \ddot{x}_t - \dot{J}_t \dot{q} \end{bmatrix},$$

where H is an inertia matrix corresponding to the wheel-legged robot, S is a selection matrix of the wheel-legged robot, $J_c$ is a contact Jacobian matrix corresponding to the wheel-legged robot, $J_t$ is a task Jacobian matrix corresponding to the wheel-legged robot, τ is a joint torque sequence corresponding to the wheel-legged robot, F is a contact force between the wheel-legged robot and the support surface, C represents Coriolis and Centrifugal forces matrix corresponding to the wheel-legged robot, $\ddot{q}$ is a joint acceleration sequence corresponding to the wheel-legged robot, $\dot{q}$ is a joint velocity sequence corresponding to the wheel-legged robot, and $\ddot{X}_t$ is predicted acceleration of operating space of the wheel-legged robot.

In some embodiments, $\ddot{X}_t$ is substituted with $$\ddot{x}_c^d(t)$$

into the foregoing whole-body dynamic equation, and the equation can be solved to obtain the joint torque sequence corresponding to the wheel-legged robot and the joint acceleration sequence corresponding to the wheel-legged robot.

$\ddot{q}$, τ, and fare unknown quantities. The rest are known quantities, and may be obtained by calculation by using location data transmitted back by a drive motor encoder and mechanical design data of the wheel-legged robot. The whole-body dynamic equation may be solved by using a matrix inversion method or a quadratic programming optimization method, to obtain the joint torque sequence corresponding to the wheel-legged robot and the joint acceleration sequence corresponding to the wheel-legged robot.

(2) Based on the joint torque sequence or the joint acceleration sequence, the contact point between the foot wheel on the outer mechanical leg and the support surface is controlled to move in the first direction, and the contact point between the foot wheel on the inner mechanical leg and the support surface is controlled to move in the second direction, to cause the wheel-legged robot to be switched from the initial posture to the predicted posture.

For example, in a case that the wheel-legged robot is controlled by torque, based on the joint torque sequence, the contact point between the foot wheel on the outer mechanical leg and the support surface is controlled to move in the first direction, and the contact point between the foot wheel on the inner mechanical leg and the support surface is controlled to move in the second direction, to cause the wheel-legged robot to be switched from the initial posture to the predicted posture.

For example, for a foot wheel on an outer mechanical leg, joint torque of the foot wheel at a future moment is transmitted to a drive motor corresponding to the foot wheel, and joint torque of a hip joint corresponding to the foot wheel at the future moment is also transmitted to a drive motor of the hip joint corresponding to the foot wheel, to perform driving by using the two drive motors to cause a contact point between the foot wheel and the support surface to move in the first direction. A movement method of a contact point between a foot wheel on an inner mechanical leg and the support surface is the same as the above. The two outer mechanical legs synchronously move, to cause contact points corresponding to the two outer mechanical legs to synchronously move in the first direction. The inner mechanical legs also synchronously move, to cause contact points corresponding to the inner mechanical legs to synchronously move in the second direction.

In some embodiments, in a case that the wheel-legged robot is controlled by location, integration is performed on the joint acceleration sequence, to obtain a joint location sequence, and based on the joint location sequence, the contact point between the foot wheel on the outer mechanical leg and the support surface is controlled to move in the first direction, and the contact point between the foot wheel on the inner mechanical leg and the support surface is controlled to move in the second direction, to cause the wheel-legged robot to be switched from the initial posture to the predicted posture.

In some embodiments, the support region of the wheel-legged robot is supported to be adjusted by torque-controlling or location-controlling, which may increase flexibility of adjusting the support region. The joint torque sequence and the joint acceleration sequence are obtained by using the whole-body dynamic equation corresponding to the wheel-legged robot, which may increase the rationality of adjusting the support region, which may increase the accuracy of adjusting the support region.

The wheel-legged robot in some embodiments performs, after receiving a control signal, corresponding movement and calculation based on the control signal. For example, all of the foregoing operations, such as moving the inner mechanical leg, moving the outer mechanical leg, calculating the predicted foot wheel location, and calculating the foot wheel reference track, are performed by the wheel-legged robot based on the control signal. The foregoing control signal may be set and adjusted according to an actual use requirement. This is not limited.

In some embodiments, for a wheel-legged robot including an inner mechanical leg and an outer mechanical leg, because rotation centers of hip joints corresponding to the wheel-legged robot are located on a same vertical plane, a support region of the wheel-legged robot can be changed by adjusting the outer mechanical leg in a first direction and adjusting the inner mechanical leg in a second direction, thereby reducing difficulty in adjusting the support region and may further increase the efficiency of adjusting the support region.

Because the wheel-legged robot can be flexibly switched between a large support region and a small support region by adjusting the inner mechanical leg and the outer mechanical leg in the two directions, the wheel-legged robot can carry loads in the large support region, and can also pass through narrow space in the small support region. A height of the wheel-legged robot can also change with the switching of the support region, expanding operating space of a body (such as an upper limb) of the wheel-legged robot, which may increase the capability of the wheel-legged robot for adapting to an environment and which may expand the scope of applications for the wheel-legged robot.

The outer mechanical legs are supported to synchronously move, the inner mechanical legs are supported to synchronously move, and a leg length remains unchanged during the movement. The support region of the wheel-legged robot and a height of the body of the wheel-legged robot can be flexibly adjusted in a case that the body of the wheel-legged robot remains unchanged. Because an influence of a change of the leg length of the mechanical leg on the support region may not be considered, complexity of adjusting the support region is further reduced.

The following describes an apparatus which can be configured for performing the method according to some embodiments. For additional implementation details, reference may be made to the descriptions of the method according to some embodiments.

Figure 14:
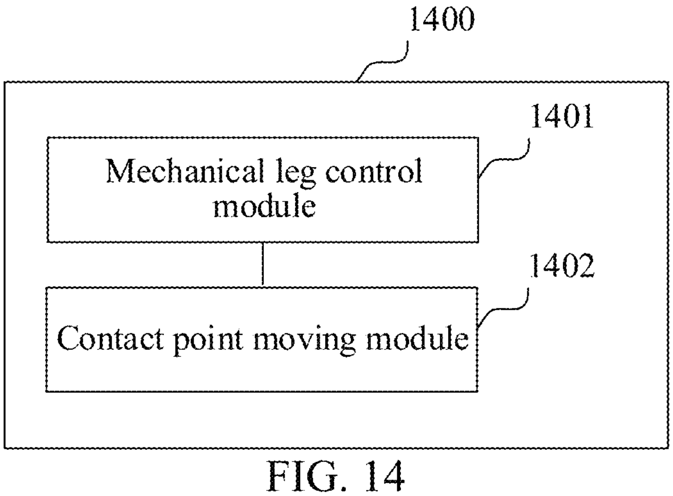
FIG. 14 is a block diagram of an apparatus for controlling a wheel-legged robot according to some embodiments.

FIG. 14 is a block diagram of an apparatus for controlling a wheel-legged robot according to some embodiments. The apparatus has a function of implementing the foregoing method for controlling a wheel-legged robot, and the function may be implemented by hardware or by hardware executing corresponding software. The apparatus may be the computer device (for example, the wheel-legged robot) described above, or may be disposed in a computer device. As shown in FIG. 14, an apparatus 1400 includes: a mechanical leg control module 1401 and a contact point moving module 1402.

The mechanical leg control module 1401 is configured to control, under a constraint of a support region corresponding to an initial posture, through an outer mechanical leg and an inner mechanical leg, the wheel-legged robot to stand on a support surface, the support region being a region enclosed by contact points respectively between foot wheels on the mechanical legs of the wheel-legged robot and the support surface.

The contact point moving module 1402 is configured to: control a contact point between a foot wheel on the outer mechanical leg and the support surface to move in a first direction, and control a contact point between a foot wheel on the inner mechanical leg and the support surface to move in a second direction, to cause the wheel-legged robot to be switched from the initial posture to a predicted posture.

Figure 15:
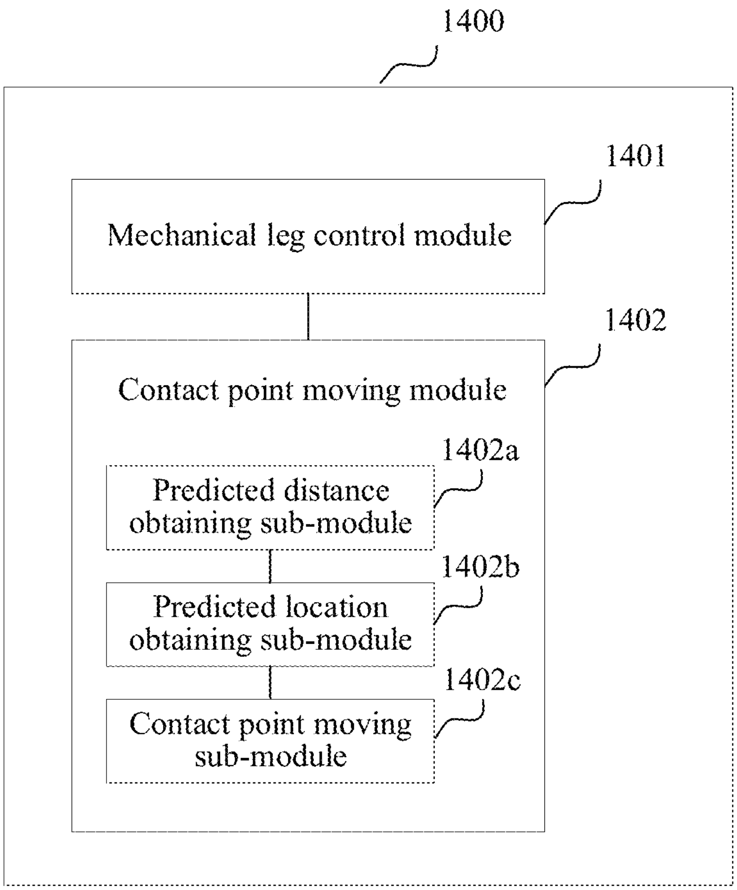
FIG. 15 is a block diagram of an apparatus for controlling a wheel-legged robot according to some embodiments.

In some embodiments, as shown in FIG. 15, the contact point moving module 1402 includes: a predicted distance obtaining sub-module 1402*a*, a predicted location obtaining sub-module 1402*b*, and a contact point moving sub-module 1402*c*.

The predicted distance obtaining sub-module 1402*a* is configured to obtain, for each hip joint, based on a predicted height corresponding to the predicted posture, a predicted relative distance between the hip joint and an associated support surface corresponding to the hip joint, the associated support surface being a plane that passes a center of a foot wheel on a mechanical leg connected to the hip joint and that is parallel to a support surface on which a foot wheel corresponding to the hip joint is located, and the predicted height being a height between a hip joint of the wheel-legged robot in the predicted posture and the support surface.

The predicted location obtaining sub-module 1402*b* is configured to obtain, based on the predicted relative distance, a predicted foot wheel location corresponding to the hip joint, the predicted foot wheel location being a location of a center of the foot wheel corresponding to the hip joint under a constraint of the predicted relative distance.

The contact point moving sub-module 1402*c* is configured to: based on predicted foot wheel locations respectively corresponding to the hip joints, control the contact point between the foot wheel on the outer mechanical leg and the support surface to move in the first direction, and control the contact point between the foot wheel on the inner mechanical leg and the support surface to move in the second direction, to cause the wheel-legged robot to be switched from the initial posture to the predicted posture.

In some embodiments, the contact point moving sub-module 1402*c* is configured to:

obtain, for each hip joint, based on the predicted foot wheel location corresponding to the hip joint and a current foot wheel location, a foot wheel reference track corresponding to the hip joint, the foot wheel reference track being configured for guiding the foot wheel corresponding to the hip joint to move from the current foot wheel location to the predicted foot wheel location;

determine, based on foot wheel reference tracks respectively corresponding to the hip joints, a predicted acceleration track corresponding to the support region of the wheel-legged robot; and based on the predicted acceleration track, control the contact point between the foot wheel on the outer mechanical leg and the support surface to move in the first direction, and control the contact point between the foot wheel on the inner mechanical leg and the support surface to move in the second direction, to cause the wheel-legged robot to be switched from the initial posture to the predicted posture.

In some embodiments, the contact point moving sub-module 1402*c* is further configured to perform interpolation on the predicted foot wheel location corresponding to the hip joint and the current foot wheel location by using a spline curve interpolation method, to obtain the foot wheel reference track corresponding to the hip joint, the foot wheel reference track including reference locations of the foot wheel corresponding to the hip joint at a plurality of future moments.

In some embodiments, the contact point moving sub-module 1402*c* is further configured to:

determine, based on the foot wheel reference tracks respectively corresponding to the hip joints, a central reference track corresponding to the support region of the wheel-legged robot, the central reference track being configured for guiding a center of the support region of the wheel-legged robot to move; and determine the predicted acceleration track based on the central reference track.

In some embodiments, the foot wheel reference track includes the reference locations of the foot wheel corresponding to the hip joint at the plurality of future moments; and the contact point moving sub-module 1402*c* is further configured to:

obtain, for each future moment, respective reference locations of the foot wheels corresponding to the hip joints at the future moment; and average the respective reference locations of the foot wheels corresponding to the hip joints at the future moment, to obtain a reference location of the center of the support region at the future moment.

In some embodiments, the predicted acceleration track is obtained through a proportion-differentiation PD controller; and the contact point moving sub-module 1402*c* is further configured to:

calculate, for each future moment corresponding to the central reference track, a difference between a real location of the center of the support region at the future moment and the reference location of the center of the support region at the future moment, to obtain a first difference;

calculate a difference between a real velocity of the center of the support region at the future moment and a reference velocity of the center of the support region at the future moment, to obtain a second difference;

multiply the first difference and a proportional coefficient corresponding to the PD controller, to obtain a first product;

multiply the second difference and a differential coefficient corresponding to the PD controller, to obtain a second product; and add the first product and the second product, to obtain predicted acceleration of the center of the support region at the future moment.

In some embodiments, the contact point moving sub-module 1402*c* is further configured to:

substitute the predicted acceleration track into a whole-body dynamic equation corresponding to the wheel-legged robot, and solve the equation to obtain a joint torque sequence and a joint acceleration sequence that correspond to the wheel-legged robot, the joint torque sequence including a joint torque corresponding to each hip joint and a joint torque corresponding to each foot wheel, and the joint acceleration sequence including joint acceleration corresponding to each hip joint and joint acceleration corresponding to each foot wheel; and based on the joint torque sequence or the joint acceleration sequence, control the contact point between the foot wheel on the outer mechanical leg and the support surface to move in the first direction, and control the contact point between the foot wheel on the inner mechanical leg and the support surface to move in the second direction, to cause the wheel-legged robot to be switched from the initial posture to the predicted posture.

In some embodiments, the contact point moving sub-module 1402*c* is further configured to:

in a case that the wheel-legged robot is controlled by torque, based on the joint torque sequence, control the contact point between the foot wheel on the outer mechanical leg and the support surface to move in the first direction, and control the contact point between the foot wheel on the inner mechanical leg and the support surface to move in the second direction, to cause the wheel-legged robot to be switched from the initial posture to the predicted posture;

or in a case that the wheel-legged robot is controlled by location, perform integration on the joint acceleration sequence, to obtain a joint location sequence, and based on the joint location sequence, control the contact point between the foot wheel on the outer mechanical leg and the support surface to move in the first direction, and control the contact point between the foot wheel on the inner mechanical leg and the support surface to move in the second direction, to cause the wheel-legged robot to be switched from the initial posture to the predicted posture.

In some embodiments, the predicted location obtaining sub-module 1402*b* is configured to:

obtain a leg length of a mechanical leg connected to the hip joint; and obtain, based on the leg length and the predicted relative distance, the predicted foot wheel location corresponding to the hip joint.

In some embodiments, in a case that the foot wheel corresponding to the hip joint is located on a right side of a vertical plane, the predicted foot wheel location corresponding to the hip joint is a positive value;

or in a case that the foot wheel corresponding to the hip joint is located on a left side of a vertical plane, the predicted foot wheel location corresponding to the hip joint is a negative value.

In some embodiments, the hip joints of the wheel-legged robot are coaxial.

In some embodiments, the wheel-legged robot includes at least two inner mechanical legs, the two outer mechanical legs synchronously move, the inner mechanical legs synchronously move, and a length of the mechanical leg of the wheel-legged robot remains unchanged during a change of the support region.

In some embodiments, for a wheel-legged robot including an inner mechanical leg and an outer mechanical leg, because rotation centers of hip joints corresponding to the wheel-legged robot are located on a same vertical plane, a support region of the wheel-legged robot can be changed by adjusting the outer mechanical leg in a first direction and adjusting the inner mechanical leg in a second direction, which may reduce difficulty in adjusting the support region and which may increase efficiency of adjusting the support region.

Because the wheel-legged robot can be flexibly switched between a large support region and a small support region by adjusting the inner mechanical leg and the outer mechanical leg in the two directions, the wheel-legged robot can carry loads in the large support region, and can also pass through narrow space in the small support region. A height of the wheel-legged robot can also change with the switching of the support region, expanding operating space of a body (such as an upper limb) of the wheel-legged robot, which may increase the capability of the wheel-legged robot for adapting to an environment and which may expand the scope of applications for the wheel-legged robot.

When the apparatus provided in some embodiments implements functions of the apparatus, the division of the foregoing functional modules is an example for description. In the practical application, the functions may be assigned to and completed by different functional modules according to the requirements, for example, the internal structure of the device is divided into different functional modules, to implement all or some of the functions described above. For additional implementation details of the apparatus, reference may be made to the descriptions of the method.

Figure 16:
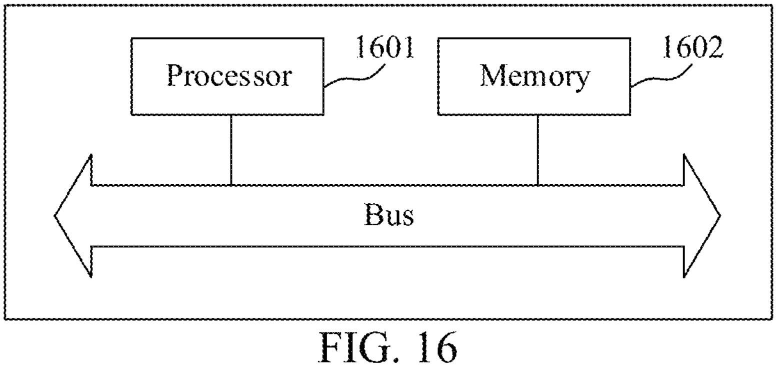
FIG. 16 is a simplified structural block diagram of a computer device according to some embodiments.

FIG. 16 is a simplified structural block diagram of a computer device according to some embodiments. The terminal device may be any electronic device having data calculation, processing, and storage capabilities.

In some embodiments, as shown in FIG. 16, the computer device includes a processor 1601 and a memory 1602. The processor 1601 may include, but is not limited to, any of the following: a central processing unit (CPU), a graphics processing unit (GPU), a field programmable gate array (FPGA), or the like. The memory 1602 may include a storage device such as a random-access memory (RAM) or a read-only memory (ROM). The processor 1601 and the memory 1602 may be connected through a system bus.

In some embodiments, the memory 1602 has a computer program stored therein, and the computer program is loaded and executed by the processor 1601 to implement the foregoing method for controlling a wheel-legged robot.

In some embodiments, a computer-readable storage medium is further provided. The storage medium has a computer program stored therein. The computer program, when executed by a processor, implements the foregoing method for controlling a wheel-legged robot.

In some embodiments, the computer-readable storage medium may include: a read-only memory (ROM), a random-access memory (RAM), a solid state drive (SSD), an optical disc, or the like. The random-access memory may include a resistance random access memory (ReRAM) and a dynamic random access memory (DRAM).

In some embodiments, a computer program product is further provided. The computer program product includes a computer program, and the computer program is stored in a computer-readable storage medium. A processor of a computer device reads the computer program from the computer-readable storage medium, and the processor executes the computer program to cause the computer device to perform the foregoing method for controlling a wheel-legged robot.

In some embodiments, before collection of relevant data of the user and during the collection of the relevant data of the user, a prompt interface or a pop-up window may be displayed, or audio prompt information may be output. The prompt interface, the pop-up window, or the audio prompt information is configured for prompting the user that the relevant data of the user is currently collected. In some embodiments, only after a confirmation operation transmitted by the user for the prompt interface or the pop-up window is obtained, a relevant operation of obtaining the relevant data of the user is started to be performed. Otherwise (in other words, the confirmation operation transmitted by the user for the prompt interface or the pop-up window is not obtained), the relevant operation of obtaining the relevant data of the user is ended, in other words, the relevant data of the user is not obtained. User data collected is processed according to requirements of relevant national laws and regulations. The obtained personal information is collected with consent and authorization of the user within the scope of authorization of the laws and regulations and a subject of the personal information. Performing of subsequent data use and processing, and collection, use, and processing of the relevant user data should comply with relevant laws, regulations, and standards of relevant countries and regions. A real environment and the like should perform under full authorization.

It is to be understood that "plurality of" means two or more. "And/or" describes an association relationship for describing associated objects and represents that three relationships may exist. For example, A and/or B may represent the following three cases: Only A exists, both A and B exist, and only B exists. The character "/" indicates an "or" relationship between the associated objects. The operation numbers schematically show an execution sequence of the operations. In some embodiments, the operations may not be performed according to the number sequence. For example, two operations with different numbers may be performed or two operations with different numbers may be performed according to a sequence contrary to the sequence shown in the figure. This is not limited.

The foregoing embodiments are used for describing, instead of limiting the technical solutions of the disclosure. A person of ordinary skill in the art shall understand that although the disclosure has been described in detail with reference to the foregoing embodiments, modifications can be made to the technical solutions described in the foregoing embodiments, or equivalent replacements can be made to some technical features in the technical solutions, provided that such modifications or replacements do not cause the essence of corresponding technical solutions to depart from the spirit and scope of the technical solutions of the embodiments of the disclosure and the appended claims.

What is claimed is:

1. A method for controlling a wheel-legged robot, performed by a computer device, wherein the wheel-legged robot includes a body, and a plurality of mechanical legs, including two outer mechanical legs, and at least one inner mechanical leg, that are connected to the body through a plurality of hip joints, wherein a first hip joint corresponds to the at least one inner mechanical leg and is located between two hip joints for the two outer mechanical legs, wherein a first rotation center of the first hip joint corresponds to the at least one inner mechanical leg, a second rotation center of a second hip joint corresponds to a first outer mechanical leg, and wherein the first rotation center and the second rotation center are located on a same vertical plane, the method comprising:

controlling, under a first constraint of a support region corresponding to an initial posture, through the first outer mechanical leg and the at least one inner mechanical leg, the wheel-legged robot to stand on a first support surface, wherein the support region is enclosed by contact points between a plurality of foot wheels of the plurality of mechanical legs of the wheel-legged robot and the first support surface; and controlling a first contact point between a first foot wheel on the first outer mechanical leg and the first support surface to move in a first direction, and controlling a second contact point between a second foot wheel on the at least one inner mechanical leg and the first support surface to move in a second direction, to cause the wheel-legged robot to be switched from the initial posture to a predicted posture.

2. The method according to claim 1, wherein the controlling the first contact point and the second contact point comprises:

obtaining, for a third hip joint, based on a predicted height corresponding to the predicted posture, a predicted relative distance between the third hip joint and an associated support surface corresponding to the third hip joint, wherein the associated support surface comprises a plane that passes a center of a third foot wheel on a third mechanical leg connected to the third hip joint, wherein the plane is parallel to a second support surface on which a fourth foot wheel corresponding to the third hip joint is located, and wherein the predicted height is a height between a fourth hip joint of the wheel-legged robot in the predicted posture and the second support surface;

obtaining, based on the predicted relative distance, a predicted foot wheel location corresponding to the third hip joint, wherein the predicted foot wheel location is a center of the fourth foot wheel under a second constraint of the predicted relative distance; and based on a plurality of predicted foot wheel locations corresponding to the plurality of hip joints, controlling the first contact point and the second contact point to move in the second direction, to cause the wheel-legged robot to be switched from the initial posture to the predicted posture.

3. The method according to claim 2, wherein the controlling the first contact point and the second contact point comprises:

obtaining, for a fifth hip joint, based on the predicted foot wheel location corresponding to the fifth hip joint and a current foot wheel location, a foot wheel reference track corresponding to the fifth hip joint for guiding a fifth foot wheel corresponding to the fifth hip joint to move from the current foot wheel location to the predicted foot wheel location;

determining, based on a plurality of foot wheel reference tracks corresponding to the plurality of hip joints, a predicted acceleration track corresponding to the support region; and based on the predicted acceleration track, controlling the first contact point to move in the first direction, and controlling the second contact point to move in the second direction, to cause the wheel-legged robot to be switched from the initial posture to the predicted posture.

4. The method according to claim 3, wherein the obtaining the foot wheel reference track comprises:

performing interpolation on the predicted foot wheel location and the current foot wheel location based on spline curve interpolation, to obtain the foot wheel reference track corresponding to the fifth hip joint, and wherein the foot wheel reference track comprises a plurality of reference locations of the fifth foot wheel at a plurality of future moments.

5. The method according to claim 3, wherein the determining the predicted acceleration track comprises:

determining, based on the plurality of foot wheel reference tracks, a central reference track corresponding to the support region for guiding a center of the support region to move; and determining the predicted acceleration track based on the central reference track.

6. The method according to claim 5, wherein the foot wheel reference track comprises a plurality of reference locations of the fifth foot wheel at a plurality of future moments, and wherein the determining the central reference track comprises:

obtaining, for a first future moment, a plurality of respective reference locations of the plurality of foot wheels; and averaging the plurality of respective reference locations, to obtain a reference location of the center of the support region at the first future moment.

7. The method according to claim 6, wherein the predicted acceleration track is obtained via a proportion-differentiation (PD) controller, and wherein the determining the predicted acceleration track based on the central reference track comprises:

calculating, for a second future moment corresponding to the central reference track, a first difference between a real location of the center of the support region at the second future moment and the reference location of the center of the support region at the second future moment;

calculating a second difference between a real velocity of the center of the support region at the second future moment and a reference velocity of the center of the support region at the second future moment;

multiplying the first difference and a proportional coefficient corresponding to the PD controller, to obtain a first product;

multiplying the second difference and a differential coefficient corresponding to the PD controller, to obtain a second product; and adding the first product and the second product, to obtain a predicted acceleration of the center of the support region at the second future moment.

8. The method according to claim 3, wherein the controlling the first contact point and the second contact point comprises:

substituting the predicted acceleration track into a whole-body dynamic equation corresponding to the wheel-legged robot, and solving the whole-body dynamic equation to obtain a joint torque sequence and a joint acceleration sequence that correspond to the wheel-legged robot, wherein the joint torque sequence comprises a first plurality of joint torques corresponding to the plurality of hip joints and a second plurality of joint torques corresponding to the plurality of foot wheels, and wherein the joint acceleration sequence comprises a first plurality of joint accelerations corresponding to the plurality of hip joints and a second plurality of joint accelerations corresponding to the plurality of foot wheels; and based on the joint torque sequence or the joint acceleration sequence, controlling the first contact point to move in the first direction, and controlling the second contact point to move in the second direction, to cause the wheel-legged robot to be switched from the initial posture to the predicted posture.

9. The method according to claim 8, wherein the controlling the first contact point and the second contact point comprises:

based on the wheel-legged robot being controlled by torque, controlling, based on the joint torque sequence, the first contact point to move in the first direction, and controlling the second contact point to move in the second direction, to cause the wheel-legged robot to be switched from the initial posture to the predicted posture; and based on the wheel-legged robot being controlled by location, integrating the joint acceleration sequence, to obtain a joint location sequence, and based on the joint location sequence, controlling the first contact point to move in the first direction, and controlling the second contact point to move in the second direction, to cause the wheel-legged robot to be switched from the initial posture to the predicted posture.

10. The method according to claim 2, wherein the obtaining the predicted foot wheel location comprises:

obtaining a leg length of a mechanical leg connected to the third hip joint; and obtaining, based on the leg length and the predicted relative distance, the predicted foot wheel location corresponding to the third hip joint.

11. An apparatus for controlling a wheel-legged robot comprising a body, and a plurality of mechanical legs, comprising two outer mechanical legs, and at least one inner mechanical leg, that are connected to the body through a plurality of hip joints, wherein a first hip joint corresponds to the at least one inner mechanical leg and is located between two hip joints for the two outer mechanical legs, wherein a first rotation center of the first hip joint corresponds to the at least one inner mechanical leg, a second rotation center of a second hip joint corresponds to a first outer mechanical leg, and wherein the first rotation center and the second rotation center are located on a same vertical plane; and the apparatus comprising:

at least one memory configured to store computer program code; and at least one processor configured to read the program code and operate as instructed by the program code, the program code comprising:

mechanical leg control code configured to cause at least one of the at least one processor to: control, under a first constraint of a support region corresponding to an initial posture, through the first outer mechanical leg and the at least one inner mechanical leg, the wheel-legged robot to stand on a first support surface, wherein the support region is enclosed by contact points between a plurality of foot wheels of the plurality of mechanical legs of the wheel-legged robot and the first support surface; and contact point moving code configured to cause at least one of the at least one processor to: control a first contact point between a first foot wheel on the first outer mechanical leg and the first support surface to move in a first direction, and control a second contact point between a second foot wheel on the at least one inner mechanical leg and the first support surface to move in a second direction, to cause the wheel-legged robot to be switched from the initial posture to a predicted posture.

12. The apparatus according to claim 11, wherein the contact point moving code is configured to cause at least one of the at least one processor to:

obtain, for a third hip joint, based on a predicted height corresponding to the predicted posture, a predicted relative distance between the third hip joint and an associated support surface corresponding to the third hip joint, wherein the associated support surface comprises a plane that passes a center of a third foot wheel on a third mechanical leg connected to the third hip joint, wherein the plane is parallel to a second support surface on which a fourth foot wheel corresponding to the third hip joint is located, and wherein the predicted height is a height between a fourth hip joint of the wheel-legged robot in the predicted posture and the second support surface;

obtain, based on the predicted relative distance, a predicted foot wheel location corresponding to the third hip joint, wherein the predicted foot wheel location is a center of the fourth foot wheel under a second constraint of the predicted relative distance; and based on a plurality of predicted foot wheel locations corresponding to the plurality of hip joints, control the first contact point and the second contact point to move in the second direction, to cause the wheel-legged robot to be switched from the initial posture to the predicted posture.

13. The apparatus according to claim 12, wherein the contact point moving code is configured to cause at least one of the at least one processor to:

obtain, for a fifth hip joint, based on the predicted foot wheel location corresponding to the fifth hip joint and a current foot wheel location, a foot wheel reference track corresponding to the fifth hip joint for guiding a fifth foot wheel corresponding to the fifth hip joint to move from the current foot wheel location to the predicted foot wheel location;

determine, based on a plurality of foot wheel reference tracks corresponding to the plurality of hip joints, a predicted acceleration track corresponding to the support region; and based on the predicted acceleration track, control the first contact point to move in the first direction, and controlling the second contact point to move in the second direction, to cause the wheel-legged robot to be switched from the initial posture to the predicted posture.

14. The apparatus according to claim 13, wherein the contact point moving code is configured to cause at least one of the at least one processor to:

perform interpolation on the predicted foot wheel location and the current foot wheel location based on spline curve interpolation, to obtain the foot wheel reference track corresponding to the fifth hip joint, and wherein the foot wheel reference track comprises a plurality of reference locations of the fifth foot wheel at a plurality of future moments.

15. The apparatus according to claim 13, wherein the contact point moving code is configured to cause at least one of the at least one processor to:

determine, based on the plurality of foot wheel reference tracks, a central reference track corresponding to the support region for guiding a center of the support region to move; and determine the predicted acceleration track based on the central reference track.

16. The apparatus according to claim 15, wherein the foot wheel reference track comprises a plurality of reference locations of the fifth foot wheel at a plurality of future moments, and wherein the contact point moving code is configured to cause at least one of the at least one processor to:

obtain, for a first future moment, a plurality of respective reference locations of the plurality of foot wheels; and average the plurality of respective reference locations, to obtain a reference location of the center of the support region at the first future moment.

17. The apparatus according to claim 16, wherein the predicted acceleration track is obtained via a proportion-differentiation (PD) controller, and wherein the contact point moving code is configured to cause at least one of the at least one processor to:

calculate, for a second future moment corresponding to the central reference track, a first difference between a real location of the center of the support region at the second future moment and the reference location of the center of the support region at the second future moment;

calculate a second difference between a real velocity of the center of the support region at the second future moment and a reference velocity of the center of the support region at the second future moment;

multiply the first difference and a proportional coefficient corresponding to the PD controller, to obtain a first product;

multiply the second difference and a differential coefficient corresponding to the PD controller, to obtain a second product; and add the first product and the second product, to obtain a predicted acceleration of the center of the support region at the second future moment.

18. The apparatus according to claim 13, wherein the contact point moving code is configured to cause at least one of the at least one processor to:

substitute the predicted acceleration track into a whole-body dynamic equation corresponding to the wheel-legged robot, and solving the whole-body dynamic equation to obtain a joint torque sequence and a joint acceleration sequence that correspond to the wheel-legged robot, wherein the joint torque sequence comprises a first plurality of joint torques corresponding to the plurality of hip joints and a second plurality of joint torques corresponding to the plurality of foot wheels, and wherein the joint acceleration sequence comprises a first plurality of joint accelerations corresponding to the plurality of hip joints and a second plurality of joint accelerations corresponding to the plurality of foot wheels; and based on the joint torque sequence or the joint acceleration sequence, control the first contact point to move in the first direction, and controlling the second contact point to move in the second direction, to cause the wheel-legged robot to be switched from the initial posture to the predicted posture.

19. The apparatus according to claim 18, wherein the contact point moving code is configured to cause at least one of the at least one processor to:

based on the wheel-legged robot being controlled by torque, control, based on the joint torque sequence, the first contact point to move in the first direction, and controlling the second contact point to move in the second direction, to cause the wheel-legged robot to be switched from the initial posture to the predicted posture; and based on the wheel-legged robot being controlled by location, integrate the joint acceleration sequence, to obtain a joint location sequence, and based on the joint location sequence, control the first contact point to move in the first direction, and controlling the second contact point to move in the second direction, to cause the wheel-legged robot to be switched from the initial posture to the predicted posture.

20. A non-transitory computer-readable storage medium, storing computer code which, when executed by at least one processor of a wheel-legged robot including a body, and a plurality of mechanical legs, including two outer mechanical legs, and at least one inner mechanical leg, that are connected to the body through a plurality of hip joints, wherein a first hip joint corresponds to the at least one inner mechanical leg and is located between two hip joints for the two outer mechanical legs, wherein a first rotation center of the first hip joint corresponds to the at least one inner mechanical leg, a second rotation center of a second hip joint corresponds to a first outer mechanical leg, and wherein the first rotation center and the second rotation center are located on a same vertical plane, causes the at least one processor to at least:

control, under a first constraint of a support region corresponding to an initial posture, through the first outer mechanical leg and the at least one inner mechanical leg, the wheel-legged robot to stand on a first support surface, wherein the support region is enclosed by contact points between a plurality of foot wheels of the plurality of mechanical legs of the wheel-legged robot and the first support surface; and control a first contact point between a first foot wheel on the first outer mechanical leg and the first support surface to move in a first direction, and controlling a second contact point between a second foot wheel on the at least one inner mechanical leg and the first support surface to move in a second direction, to cause the wheel-legged robot to be switched from the initial posture to a predicted posture.

* * * * *